US009639721B2

(12) United States Patent
Tsirline et al.

(10) Patent No.: US 9,639,721 B2
(45) Date of Patent: May 2, 2017

(54) ENCODING MODULE, ASSOCIATED ENCODING ELEMENT, CONNECTOR, PRINTER-ENCODER AND ACCESS CONTROL SYSTEM

(71) Applicant: ZIH Corp., Lincolnshire, IL (US)

(72) Inventors: Boris Y. Tsirline, Glenview, IL (US); Robert S. Gawelczyk, Chicago, IL (US); Steven R. Kovanko, Downers Grove, IL (US); Anthony Brown, Spring Grove, IL (US); Mao Tian, Halifax (CA); Karl Torchalski, Arlington Heights, IL (US); Michael Fein, Ann Arbor, MI (US); Christopher Aiello, Franklin Park, IL (US)

(73) Assignee: ZIH Corp., Lincolnshire, IL (US)

( * ) Notice: Subject to any disclaimer, the term of this patent is extended or adjusted under 35 U.S.C. 154(b) by 194 days.

(21) Appl. No.: 14/502,815

(22) Filed: Sep. 30, 2014

(65) Prior Publication Data
US 2015/0136852 A1    May 21, 2015

Related U.S. Application Data

(63) Continuation of application No. 12/618,107, filed on Nov. 13, 2009, now Pat. No. 8,878,652.

(51) Int. Cl.
*G06K 7/10* (2006.01)
*G06K 1/18* (2006.01)
*G06K 17/00* (2006.01)

(52) U.S. Cl.
CPC .......... *G06K 7/10336* (2013.01); *G06K 1/18* (2013.01); *G06K 7/10079* (2013.01);
(Continued)

(58) Field of Classification Search
CPC .. G06K 1/18; G06K 7/10336; G06K 17/0009; G06K 7/10079; G06K 7/10316;
(Continued)

(56) References Cited

U.S. PATENT DOCUMENTS

| 3,713,148 A | 1/1973 | Cardullo et al. |
| 4,847,626 A | 7/1989 | Kahler et al. |

(Continued)

FOREIGN PATENT DOCUMENTS

| CN | 2385386 Y | 6/2000 |
| CN | 101529846 A | 9/2009 |

(Continued)

OTHER PUBLICATIONS

Isidor Straus; *Near and Far Fields—From Statics to Radiation*; Curtis-Straus LLC; Conformity 2001 (5 pgs.).

(Continued)

*Primary Examiner* — An T Nguyen

(57) ABSTRACT

An encoding module and related systems and components are provided. The encoding module includes a plurality of encoding elements arranged in an array of columns and rows and one or more switching elements configured to selectively connect the encoding elements to a reader. The connection of the encoding elements may be based on the location of a targeted transponder disposed among multiple adjacent transponders to ensure the selective communication with the targeted transponder only. The module is configured for various types and locations transponders to be used within a system, such as a printer-encoder. Each encoding element may include a loaded conductive strip comprising a loop shape portion and a shield that corresponds to the loop shape portion. In another embodiment, an access control system having an encoding module with the plurality of (Continued)

couplers and an access card having a plurality of transponders corresponding to the couplers is provided.

22 Claims, 24 Drawing Sheets

(52) U.S. Cl.
CPC ..... *G06K 7/10316* (2013.01); *G06K 7/10346* (2013.01); *G06K 17/00* (2013.01); *G06K 17/0009* (2013.01); *G06K 17/0025* (2013.01); *G06K 2017/0083* (2013.01)

(58) Field of Classification Search
CPC .......... G06K 2017/0083; G06K 17/00; G06K 7/10346; G06K 17/0025
See application file for complete search history.

(56) References Cited

U.S. PATENT DOCUMENTS

| | | | |
|---|---|---|---|
| 5,912,622 A * | 6/1999 | Endo | B62H 5/20 29/846 |
| 5,977,877 A | 11/1999 | McCulloch et al. | |
| 6,285,342 B1 | 9/2001 | Brady et al. | |
| 6,377,464 B1 * | 4/2002 | Hashemi | H01L 23/552 257/516 |
| 6,392,544 B1 | 5/2002 | Collins et al. | |
| 7,225,992 B2 | 6/2007 | Forster | |
| 7,273,173 B2 | 9/2007 | Forster | |
| 7,398,054 B2 | 7/2008 | Tsirline et al. | |
| 7,425,887 B2 * | 9/2008 | Tsirline | G06K 7/0008 340/10.1 |
| 8,878,652 B2 * | 11/2014 | Tsirline | G06K 1/18 235/432 |
| 9,070,066 B1 * | 6/2015 | Oliver | G06K 19/07756 |
| 2004/0195324 A1 | 10/2004 | Uchiyama et al. | |
| 2005/0045723 A1 * | 3/2005 | Tsirline | G06K 1/12 235/451 |
| 2005/0045724 A1 | 3/2005 | Tsirline et al. | |
| 2005/0058483 A1 | 3/2005 | Chapman et al. | |
| 2005/0173532 A1 * | 8/2005 | Hasebe | G06K 7/10178 235/451 |
| 2005/0190614 A1 * | 9/2005 | Brunette | H05K 1/0222 365/192 |
| 2005/0274799 A1 | 12/2005 | Torchalski et al. | |
| 2005/0280512 A1 * | 12/2005 | Forster | G06K 7/0008 340/10.34 |
| 2006/0061350 A1 * | 3/2006 | Myers | G01R 15/205 324/117 R |
| 2006/0092079 A1 * | 5/2006 | de Rochemont | H01Q 1/362 343/700 MS |
| 2006/0104689 A1 | 5/2006 | Marowski et al. | |
| 2006/0109496 A1 * | 5/2006 | Brown | G06K 7/0008 358/1.15 |
| 2006/0212241 A1 * | 9/2006 | Chiu | G01S 13/75 702/75 |
| 2007/0040689 A1 | 2/2007 | Reynolds | |
| 2007/0099566 A1 | 5/2007 | Borisov et al. | |
| 2007/0109709 A1 * | 5/2007 | Anthony | H01G 4/35 361/118 |
| 2007/0200204 A1 * | 8/2007 | Suzuki | H01L 23/552 257/664 |
| 2007/0216591 A1 * | 9/2007 | Tsirline | G06K 7/10316 343/753 |
| 2007/0262873 A1 | 11/2007 | Tsirline et al. | |
| 2007/0268143 A1 | 11/2007 | Copeland et al. | |
| 2008/0232883 A1 * | 9/2008 | Klein | G06K 7/10079 400/76 |
| 2008/0238606 A1 * | 10/2008 | Tsirline | G06K 7/0008 340/2.1 |
| 2009/0008448 A1 | 1/2009 | Tsirline et al. | |
| 2009/0163147 A1 * | 6/2009 | Steigerwald | H05K 1/0219 455/73 |
| 2009/0212390 A1 * | 8/2009 | Rofougaran | H01L 23/48 257/531 |
| 2010/0024669 A1 * | 2/2010 | Feltz | G06K 1/121 101/212 |
| 2010/0253462 A1 * | 10/2010 | Hardy | H01Q 13/206 336/200 |
| 2011/0115611 A1 * | 5/2011 | Tsirline | G06K 1/18 340/10.2 |
| 2015/0136852 A1 * | 5/2015 | Tsirline | G06K 1/18 235/439 |

FOREIGN PATENT DOCUMENTS

| | | |
|---|---|---|
| JP | 2003296669 A | 10/2003 |
| JP | 2008171192 A | 7/2008 |
| JP | 2008171193 A | 7/2008 |
| JP | 2009169578 A | 7/2009 |
| WO | 2005/028203 A1 | 3/2005 |
| WO | WO 2005/022445 A2 | 3/2005 |
| WO | WO 2008/036907 | 3/2008 |

OTHER PUBLICATIONS

Charles Capps; *Near Field or Far Field?*; EDN, Aug. 16, 2001; pp. 95-102.
Kirk T. McDonald; *Radiation in the Near Zone of a Hertzian Dipole*; Joseph Henry Laboratories; Princeton University; Princeton, NJ; Apr. 220, 2004 (5 pgs.).
Rajeev Bansal; *The Far-Field: How Far is Far Enough?*; Applied Microwave & Wireless; Nov. 1999; pp. 58 and 60.
Ron Schmitt; *Understanding Electromagnetic Fields and Antenna Radiation Takes (Almost) No Math*; EDN; Mar. 2, 2000; pp. 77-88.
Xianming Qing and Ning Yang; *2.45 GHZ Circularly Polarized RFID Reader Antenna*; IEEE; 2004; pp. 612-615 (XP10743394).
Boris Y. Tsirline; *UHF RFID Antennas for Printer-Encoders—Part 1: System Requirements*; High Frequency Electronics; Sep. 2007; pp. 28-39 (8 pgs.); Summit Technical Media, LLC.
Boris Y. Tsirline; *UHF RFID Antennas for Printer-Encoders—Part 2: Antenna Types*; High Frequency Electronics; Oct. 2007; pp. 36-45 (8 pgs.); Summit Technical Media, LLC.
Boris Y. Tsirline; *UHF RFID Antennas for Printer-Encoders—Part 3: Mobile Equipment*; High Frequency Electronics; Nov. 2007; pp. 18-25 (5 pgs.); Summit Technical Media, LLC.
*Sony's Electromagnetic Wave Absorber Reduces EMC and SAR Problems* http://www.sony.net/products/sc-hp/ex_news/vol25/pdf/emcstw.pdf.
Partial International Search Report for International Application No. PCT/US2010/056590 mailed on Feb. 15, 2011; 5 sheets.
International Search Report and Written Opinion for International Application No. PCT/US2010/034343 mailed on Aug. 20, 2010; 13 sheets.
Notice of Allowance in U.S. Appl. No. 12/618,107 mailed Jul. 1, 2014.
Final Office Action in U.S. Appl. No. 12/618,107 mailed Feb. 11, 2014.
Non-final Office Action in U.S. Appl. No. 12/618,107 mailed Jun. 4, 2013.
Final Office Action in U.S. Appl. No. 12/618,107 mailed Dec. 31, 2012.
Non-final Office Action in U.S. Appl. No. 12/618,107 mailed Mar. 13, 2012.
Tom Ahlkvist Scharfeld; An Analysis of the Fundamental Constraints on Low Cost Passive Radio-Frequency Identification System Design; Massachusetts Institute of Technology, Aug. 2001; pp. 1-115; Available in U.S. Appl. No. 12/618,107 to which priority is claimed.
Isidor Straus; Loops and Whips, Oh My! On Low Frequency Measurement Issues; Conformity; Aug. 2002; pp. 22-28; Available in U.S. Appl. No. 12/618,107 to which priority is claimed.
Hung Tien Nguyen and James Lambert; Microwave Circuit Design and Non-Intrusive Antenna Imaging using Near-Field Scanning Probe; University of Manitoba, Canada; Mar. 2003; (56 pgs). Available in U.S. Appl. No. 12/618,107 to which priority is claimed.

(56) References Cited

OTHER PUBLICATIONS

Prof. Dr. R. Struzak; Antenna Theory Basics; School on Digital Radio Communication for Research and Training in Developing Countries, The Abdus Salam International Centre for Theoretical Physics ICTP Trieste (Italy), Feb. 9-28, 2004; pp. 1-75; Available in U.S. Appl. No. 12/618,107 to which priority is claimed.

European Office Action for European Patent Application No. 10787605.4 mailed on Jan. 28, 2015.

Constantine A. Balanis; Chapter 2—Fundamental Parameters of Antennas: Paragraph 2.2.4—Field Regions; Antenna Theory; Analysis and Design; 2005; pp. 34-36; Third Edition; John Wiley & Sons, Inc.; Available in U.S. Appl. No. 12/618,107 to which priority is claimed.

David M. Pozar; Paragraph 2.5—The Quarter-Wave Transformer; Microwave Engineering; 2005; pp. 73-76; Third Edition; John Wiley & Sons, Inc.; Available in U.S. Appl. No. 12/618,107 to which priority is claimed.

State Intellectual Property Office (SIPO) of the People's Republic of China, "First Office Action," mailed on Mar. 28, 2014 in connection with Chinese Patent Application No. 201080051063.X.

State Intellectual Property Office (SIPO) of the People's Republic of China, "Second Office Action," mailed on Jan. 3, 2015 in connection with Chinese Patent Application No. 201080051063.X.

Korean Intellectual Property Office, "Written Opinion," mailed on Apr. 23, 2014 in connection with Korean Patent Application No. 10/2012/7015286.

Japanese Patent Office, "Reasons for Refusal," mailed on Feb. 26, 2014 in connection with Japanese Patent Application No. 2012-539030.

Extended European Search Report for European Patent Application No. 16188207.1 mailed on Mar. 2, 2017.

\* cited by examiner

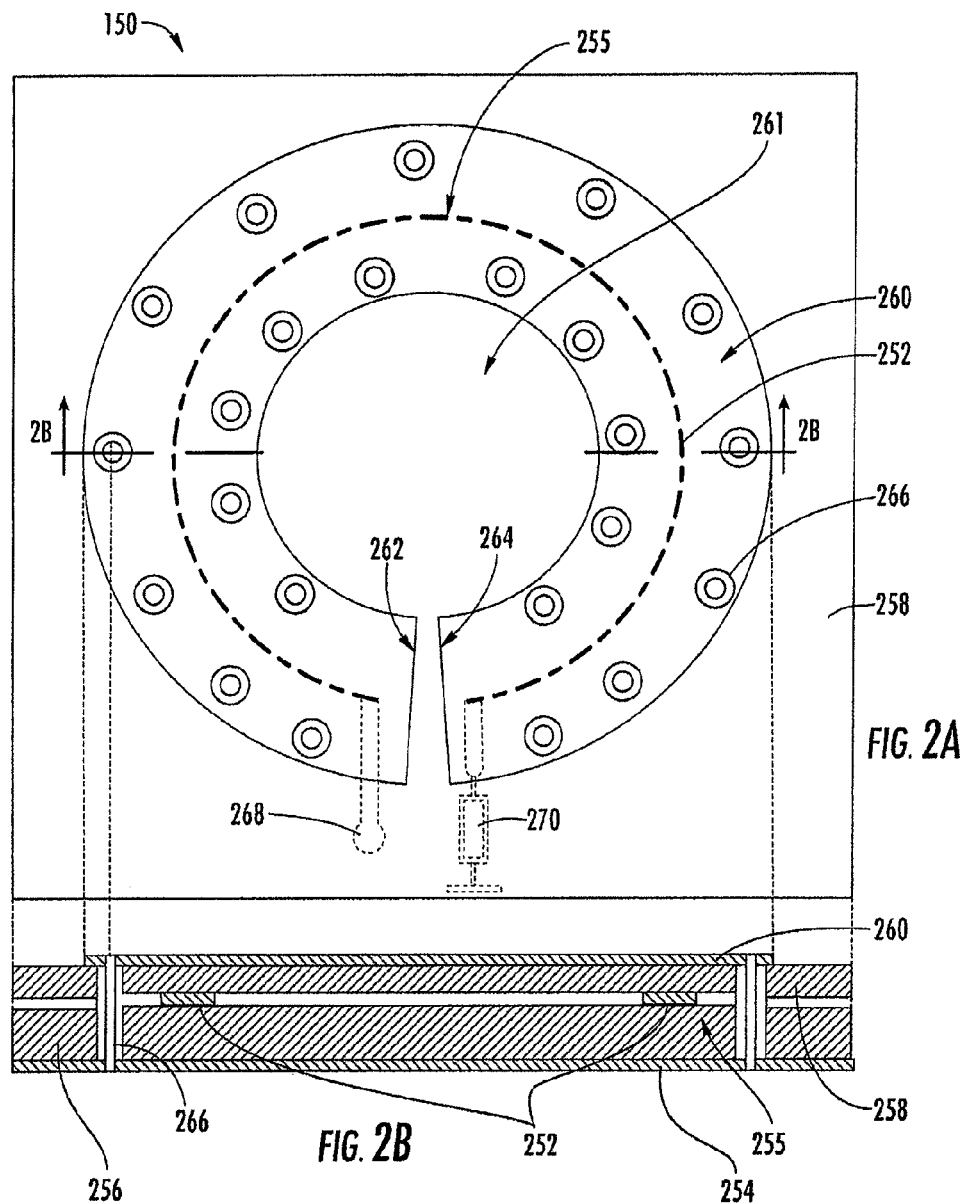

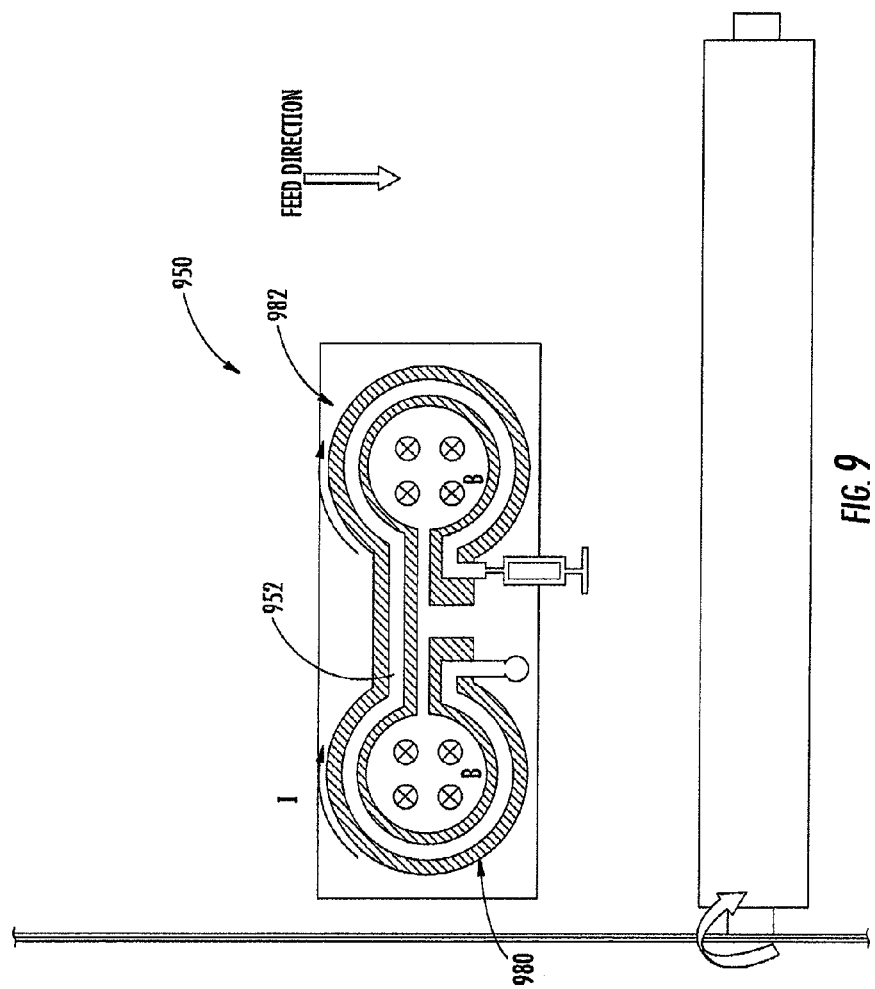

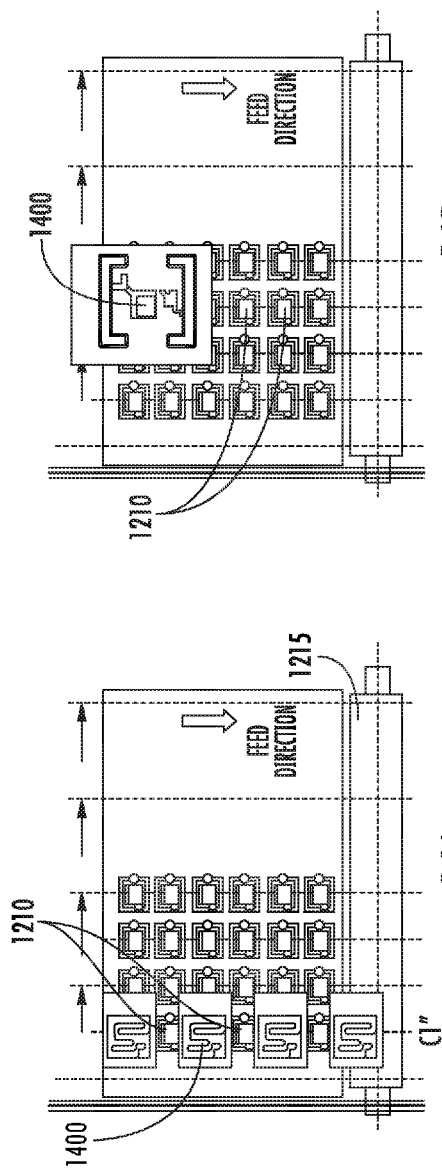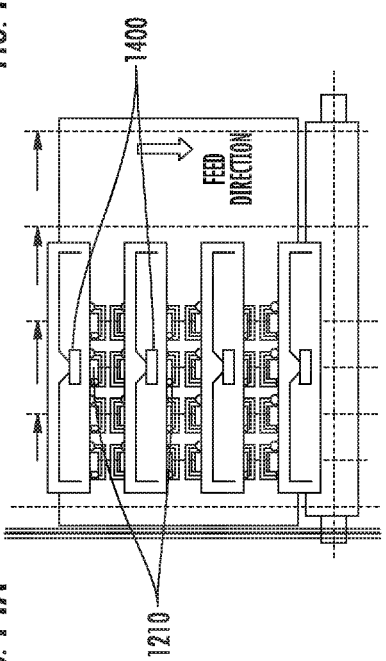

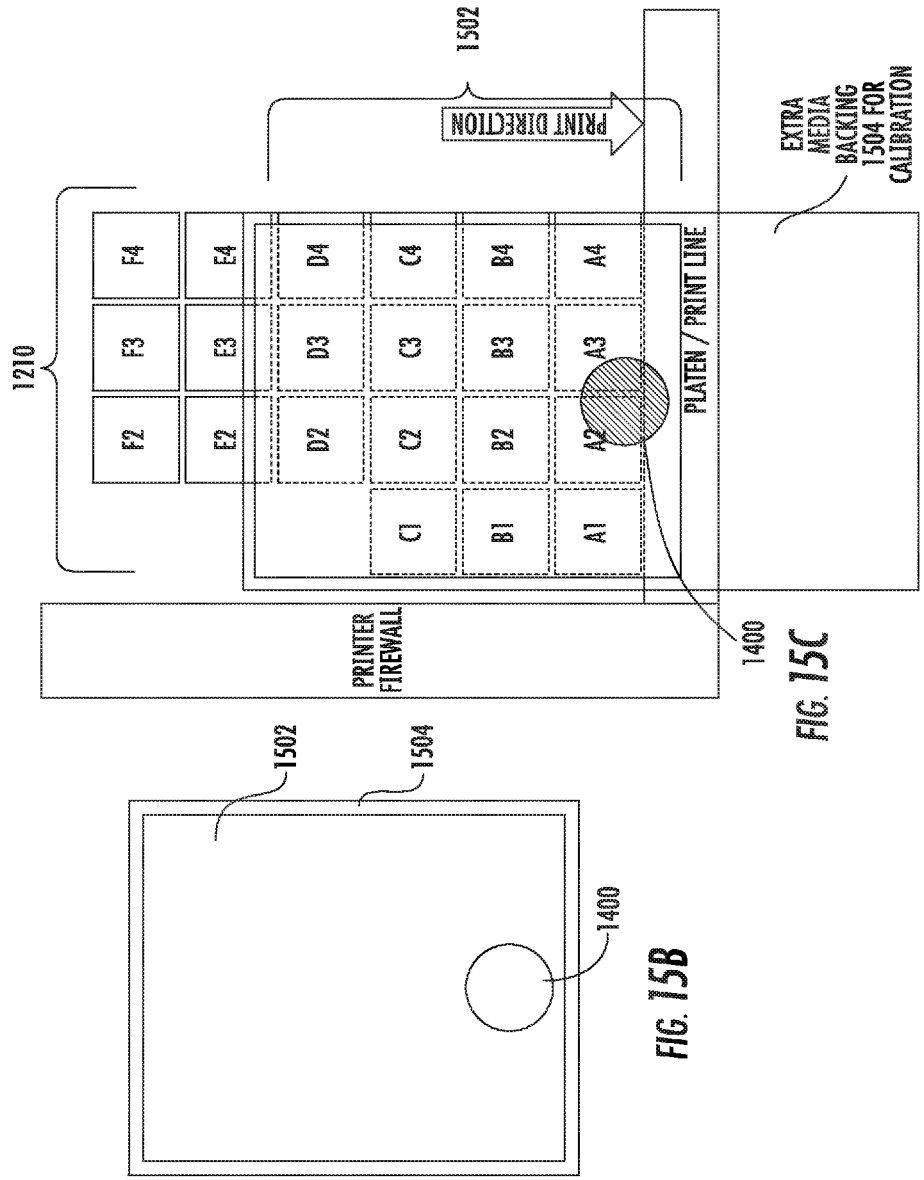

| | WRITE POWER (dBm) | | | | | | | | | | | | |
|---|---|---|---|---|---|---|---|---|---|---|---|---|---|
| 46 | 6 | 8 | 10 | 12 | 14 | 16 | 18 | 20 | 22 | 24 | 26 | 28 | 30 |
| 45 | 0 | 0 | 0 | 0 | 0 | 0 | 0 | 0 | 0 | 0 | 0 | 0 | 0 |
| 44 | 0 | 0 | 0 | 0 | 0 | 0 | 0 | 0 | 0 | 0 | 0 | 0 | 0 |
| 43 | 0 | 0 | 0 | 0 | 0 | 0 | 0 | 0 | 0 | 0 | 0 | 0 | 0 |
| 42 | 0 | 0 | 0 | 0 | 0 | 0 | 0 | 0 | 0 | 0 | 0 | 0 | 0 |
| 41 | 0 | 0 | 0 | 0 | 0 | 0 | 0 | 0 | 0 | 0 | 0 | 0 | 0 |
| 40 | 0 | 0 | 0 | 0 | 0 | 0 | 0 | 0 | 0 | 0 | 0 | 0 | 0 |
| 39 | 0 | 0 | 0 | 0 | 0 | 0 | 0 | 0 | 0 | 0 | 0 | 0 | 0 |
| 38 | 0 | 0 | 0 | 0 | 0 | 0 | 0 | 0 | 0 | 0 | 0 | 0 | 0 |
| 37 | 0 | 0 | 0 | 0 | 0 | 0 | 0 | 0 | 0 | 0 | 0 | 0 | 0 |
| 36 | 0 | 0 | 0 | 0 | 0 | 0 | 0 | 0 | 0 | 0 | 0 | 0 | 0 |
| 35 | 0 | 0 | 0 | 0 | 0 | 0 | 0 | 0 | 0 | 0 | 0 | 0 | 0 |
| 34 | 0 | 0 | 0 | 0 | 0 | 0 | 0 | 0 | 0 | 0 | 0 | 0 | 0 |
| 33 | 0 | 0 | 0 | 0 | 0 | 0 | 0 | 0 | 0 | 0 | 0 | 0 | 0 |
| 32 | 0 | 0 | 0 | 0 | 0 | 0 | 0 | 0 | 0 | 0 | 0 | 0 | 0 |
| 31 | 0 | 0 | 0 | 0 | 0 | 0 | 0 | 0 | 0 | 0 | 0 | 0 | 0 |
| 30 | 0 | 0 | 0 | 0 | 0 | 0 | 0 | 0 | 0 | 0 | 0 | 0 | 0 |
| 29 | 0 | 0 | 0 | 0 | 0 | 0 | 0 | 0 | 0 | 0 | 0 | 0 | 0 |
| 28 | 0 | 0 | 0 | 0 | 0 | 0 | 0 | 0 | 0 | 0 | 0 | 0 | 0 |
| 27 | 0 | 0 | 0 | 0 | 0 | 0 | 0 | 0 | 0 | 0 | 0 | 0 | 0 |
| 26 | 0 | 0 | 0 | 0 | 0 | 0 | 0 | 0 | 0 | 0 | 0 | 0 | 0 |
| 25 | 0 | 0 | 0 | 0 | 0 | 0 | 0 | 0 | 0 | 0 | 0 | 5 | 4 |
| 24 | 0 | 0 | 0 | 0 | 0 | 0 | 0 | 0 | 5 | 5 | 4 | 5 | 5 |
| 23 | 0 | 0 | 0 | 0 | 0 | 0 | 0 | 5 | 5 | 5 | 5 | 5 | 5 |
| 22 | 0 | 0 | 0 | 0 | 0 | 0 | 0 | 5 | 5 | 5 | 5 | 4 | 4 |
| 21 | 0 | 0 | 0 | 0 | 0 | 0 | 0 | 0 | 5 | 4 | 0 | 0 | 4 |
| 20 | 0 | 0 | 0 | 0 | 0 | 0 | 4 | 5 | 5 | 4 | 5 | 5 | 5 |
| 19 | 0 | 0 | 0 | 0 | 0 | 4 | 5 | 5 | 5 | 5 | 5 | 5 | 5 |
| 18 | 0 | 0 | 0 | 0 | 5 | 5 | 5 | 5 | 5 | 5 | 5 | 5 | 5 |
| 17 | 0 | 0 | 0 | 0 | 5 | 5 | 5 | 5 | 5 | 5 | 5 | 5 | 5 |
| 16 | 0 | 0 | 0 | 0 | 5 | 5 | 5 | 5 | 5 | 5 | 5 | 5 | 5 |
| 15 | 0 | 0 | 0 | 0 | 0 | 4 | 5 | 5 | 5 | 5 | 5 | 5 | 5 |
| 14 | 0 | 0 | 0 | 0 | 0 | 0 | 4 | 5 | 4 | 5 | 5 | 5 | 5 |
| 13 | 0 | 0 | 0 | 0 | 0 | 0 | 0 | 0 | 0 | 0 | 0 | 0 | 4 |
| 12 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 |
| 7 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 |

FIG. 15G

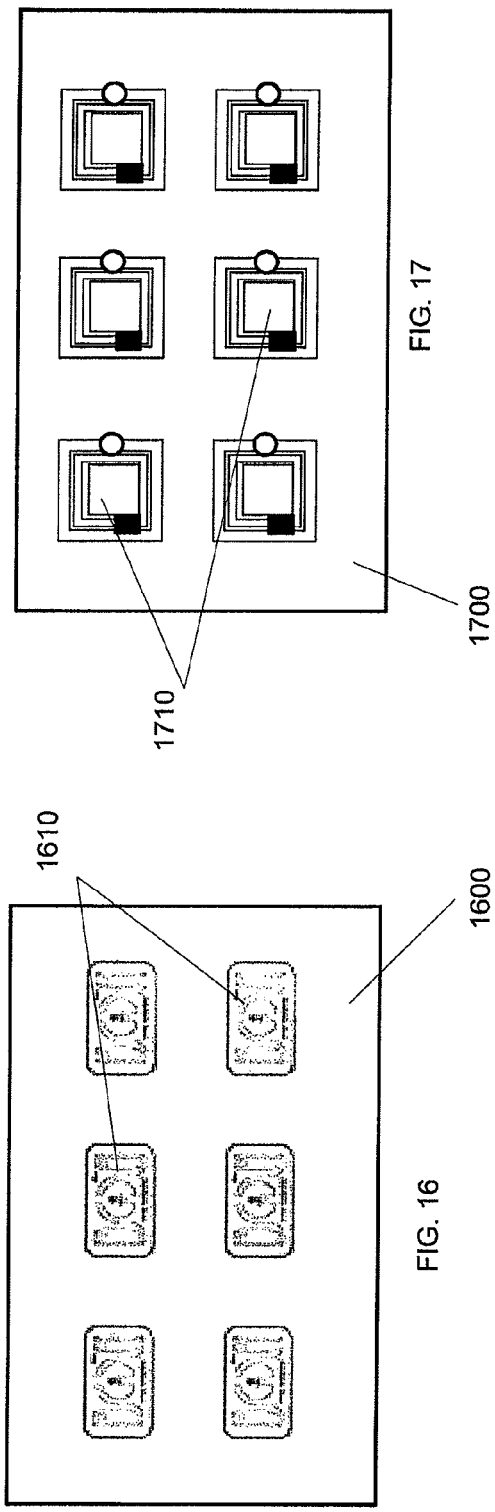
FIG. 17
FIG. 16
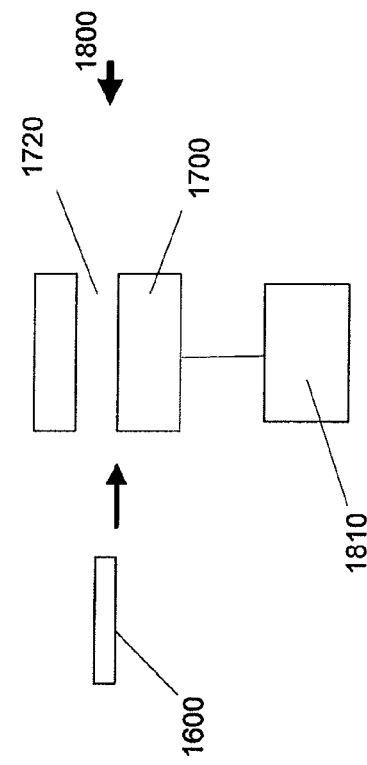
FIG. 18

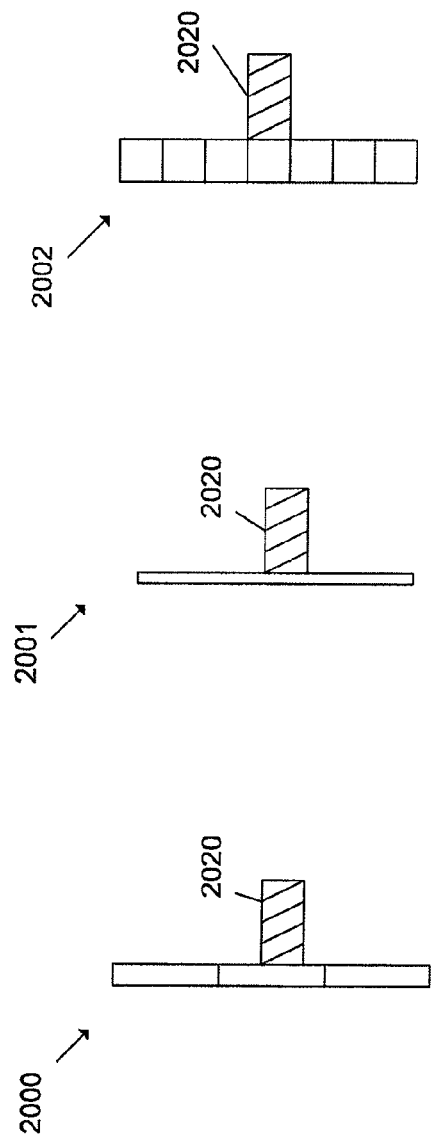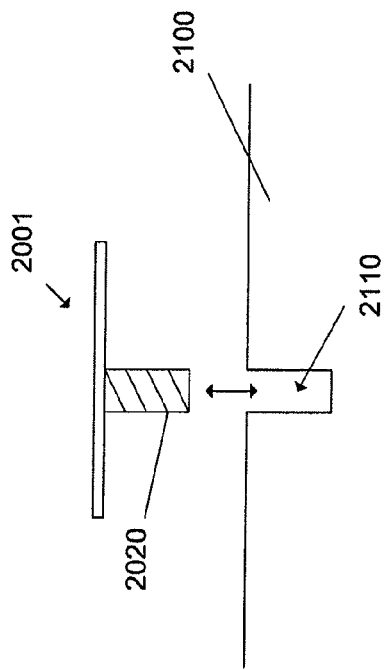

ENCODING MODULE, ASSOCIATED ENCODING ELEMENT, CONNECTOR, PRINTER-ENCODER AND ACCESS CONTROL SYSTEM

CROSS-REFERENCE TO RELATED APPLICATION

This application is a continuation of U.S. application Ser. No. 12/618,107, now U.S. Pat. No. 8,878,652, filed Nov. 13, 2009, which is incorporated by reference herein in its entirety.

BACKGROUND

Field of the Invention

The present invention relates to an encoding module and related systems and components such as encoding elements, RFID printer-encoders, and access control systems.

Description of Related Art

Radio frequency identification ("RFID") transponders, either active (e.g., battery-powered, -assisted, or -supported) or passive (e.g., RF field activated), are typically used with an RFID reader or similar device for communicating information back and forth. In order to communicate, an antenna of the reader exposes the transponder to a radio frequency (RF) electromagnetic field or signal. In the case of a passive UHF transponder, the RF electromagnetic field energizes the transponder and thereby enables the transponder to respond to the reader by re-radiating the received signal back and modulating the field in a well-known technique called backscattering. In the case of an active transponder, the transponder may respond to the electromagnetic field by transmitting an independently generated, self-powered reply signal to the reader.

Problems can occur when interrogating one targeted transponder surrounded by multiple adjacent transponders regardless on whether the transponders are field activated or independently powered by an internal energy source. For example, an interrogating electromagnetic signal may activate more than one transponder at a given time. This simultaneous activation of multiple transponders may lead to collision or communication errors because each of the multiple transponders may transmit reply signals to the reader at the same time.

The challenge of avoiding multiple and simultaneous transponder activation may be especially acute in some applications. RFID printer-encoders are one example. RFID printer-encoders are devices capable of encoding and printing a series or stream of labels with embedded transponders. A conveyor system is another example of an application in which undesirable multiple transponder activation may be acute.

SUMMARY OF VARIOUS EMBODIMENTS

Embodiments include systems, methods, computer readable media, and other means for providing an encoding module, associated encoding element, connector, printer-encoder, and access control system. For example, embodiments can include RFID printer-encoders and be capable of encoding and/or printing one or more transponders (individually or simultaneously) that are embedded in one or more labels. When encoding/printing a number of transponders in close proximity to each other, embodiments discussed herein can be configured to target a particular transponder. Moreover, embodiments can conserve, among other things, space, cost, and weight normally associated with encoding devices, which have utilized other types of EMF collision management techniques or shielding components for alleviating unintentional multiple transponder activation. Embodiments of the present invention can be configured to encode a much broader range of tag types and meet the encoding pitch, as well as allow for transponder placement independence.

For example, according to an embodiment, an encoding element is provided. The encoding element of this embodiment includes a ground plane, a first dielectric substrate, a conductive strip, a terminating load, a second dielectric substrate, and a shield. The first dielectric substrate is adjacent to the ground plane. A conductive strip is adjacent the first dielectric substrate, extends from an input end to a loaded end, and comprises at least one portion having a loop shape. The terminating load is in communication with the loaded end of the conductive strip. The second dielectric substrate is adjacent the conductive strip. The shield is adjacent an opposite surface of the second dielectric substrate from the conductive strip and generally corresponds to the at least one portion having a loop shape of the conductive strip including providing a central open area.

The conductive strip may include a plurality of portions having a loop shape. Furthermore, each of plurality of portions having a loop shape may be concentric and coplanar to each other. As another example, the conductive strip may include a first portion having a loop shape and a second portion having a loop shape. The loop shape of the first portion and the loop shape of the second portion may be non-concentric. As another example, the loop shape may be generally rectangular.

In another embodiment, the above encoding element is combined with a second encoding element. The second encoding element may include a tapered microstrip having a length of a one half wavelength, or multiple thereof or be a coplanar waveguide.

In yet another embodiment a system is provided. The system may be configured to provide selective communication between a reader and a targeted transponder disposed among multiple adjacent transponders moving along a feed path. The system of this embodiment includes a reader configured to transmit communication signals and an encoding module. The encoding module includes a plurality of encoding elements arranged in at least one column and a plurality of rows. The at least one column extends parallel with the feed path and the plurality of rows extends perpendicular to the feed path.

The system may further include one or more switching elements configured to selectively connect the plurality of encoding elements to the reader. The system may also include a processor that is configured to selectively connect one of the plurality of encoding elements to the reader through the one or more switching elements based on a location of the transponder.

The plurality of encoding elements may include a plurality of columns and a plurality of rows.

In another embodiment, a method is provided. The method includes moving a media unit having a transponder to a first position; attempting to communicate with the transponder of the media unit through at least one or more of a plurality of encoding elements arranged in an array of columns and rows; and determining an optimal encoding element for the transponder of the media unit.

The method may further include selecting the optimal encoding element as the default encoding element for transponders of subsequent media units. The method may also include identifying a reset event associated with a second media unit and upon identifying the reset event, attempting to communicate with the transponder of the second media unit through at least one or more of the plurality of encoding elements arranged in the array of columns and rows and determining an optimal encoding element for the second media unit.

The operation of attempting to communicate with the transponder of the media unit through the at least one or more of the plurality of encoding elements arranged in the array of columns and rows may include testing the at least one or more of plurality of encoding elements according to a sequence based on a likelihood of each encoding element being an optimal encoding element.

The operation of attempting to communicate with the transponder of the media unit through the at least one or more of the plurality of encoding elements arranged in the array of columns and rows may include attempting to communicate with the transponder of the media unit at a plurality of power levels.

The operation of determining the optimal encoding element for the transponder of the media unit may be based on one or more successful communication attempts and each location of each encoding element in which communications was successful or on previously stored information pertaining to at least one of the following one or more supplies used, the transponder, and an operating environment.

In another embodiment, an access control system is provided. The system may include a module and an access card. The module includes a plurality of encoding elements arranged in a particular manner. The access card includes a plurality of transponders arranged in a manner to correspond with the plurality of encoding elements of the module.

BRIEF DESCRIPTION OF THE SEVERAL VIEWS OF THE DRAWINGS

FIG. 2a is a top view of an encoding element consistent with an exemplary embodiment, wherein the circular dash line 255 represents the conductive strip beneath the shield and the top dielectric substrate;

FIG. 2b is a side view of the encoding element of FIG. 2a taken along line 2b;

FIG. 9 is a top view of an encoding element in a printer-encoder consistent with an exemplary embodiment comprising a conductive strip having two non-concentric loop shapes;

FIG. 14a is the encoding module of FIG. 12 with a first type of media units and transponders that are edge-justified;

FIG. 14b is the encoding module of FIG. 12 with a second type of media units and transponders that are center-right-justified;

FIG. 14c is the encoding module of FIG. 12 with a third type of media units and transponders that are center-justified

FIGS. 15B-15F are top views of an encoding module and media with embedded transponder in various stages of executing the method of FIG. 15A;

FIG. 15G is a table that shows the raw data the encoding module receives from a transponder during the calibration method of FIG. 15A;

FIG. 16 is a top view of an access card according to an embodiment;

FIG. 17 is a top view of an encoding module according to an embodiment;

FIG. 18 is a side schematic view of an access control system according to an embodiment;

FIG. 20a is a side view of a coupling device according to an embodiment;

FIG. 20b is a side view of a coupling device according to another embodiment;

FIG. 20c is a side view of a coupling device according to yet another embodiment;

FIG. 21 is a schematic view a printer-encoder and the coupling device of FIG. 20b.

DETAILED DESCRIPTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout and embodiments discussed herein can be combined with other embodiments and/or utilize features thereof.

RFID Printer-Encoder

Embodiments of the present invention concern an apparatus for enabling an RFID reader to selectively communicate with a targeted transponder that is commingled among or positioned in proximity to multiple adjacent transponders. As will be apparent to one of ordinary skill in the art, various embodiments of the present invention are described below that selectively communicate with a targeted transponder requiring little to no electro-magnetic isolation of the transponder through the use of space-consuming shielded housings, anechoic chambers, anti-collision protocols, or relatively more complex or costly collision management techniques, although this invention does not preclude their use.

Several embodiments of the present invention may be useful for counting, reading, writing, or otherwise encoding passive or active transponders attached to items located on assembly lines, in inventory management centers where on-demand RFID labeling may be needed, or in other similar circumstances, where the transponders are in close proximity to each other. In various embodiments, one or more transponders are mounted to or embedded within a label, ticket, card, or other media form that may be carried on a liner or carrier. In alternate linerless embodiments, a liner or carrier may not be needed. Such RFID enabled labels, tickets, tags, and other media forms are referred to collectively herein as "media units" or as "smart media units." As will be apparent to one of ordinary skill in the art, it may be desirable to print indicia such as text, numbers, barcodes, graphics, etc., to such media units before, after, or during communications with the transponders.

An example of an RFID system that may benefit from one or more of the embodiments of the present invention is a RFID enabled printer system, also referred to herein as "printer-encoder" or a RFID print-engine applicators. Examples of printer-encoders are disclosed in commonly-owned U.S. Pat. Nos. 6,481,907; 6,848,616; and 7,398,054 which are hereby incorporated herein by reference in their entirety.

Figure 1:
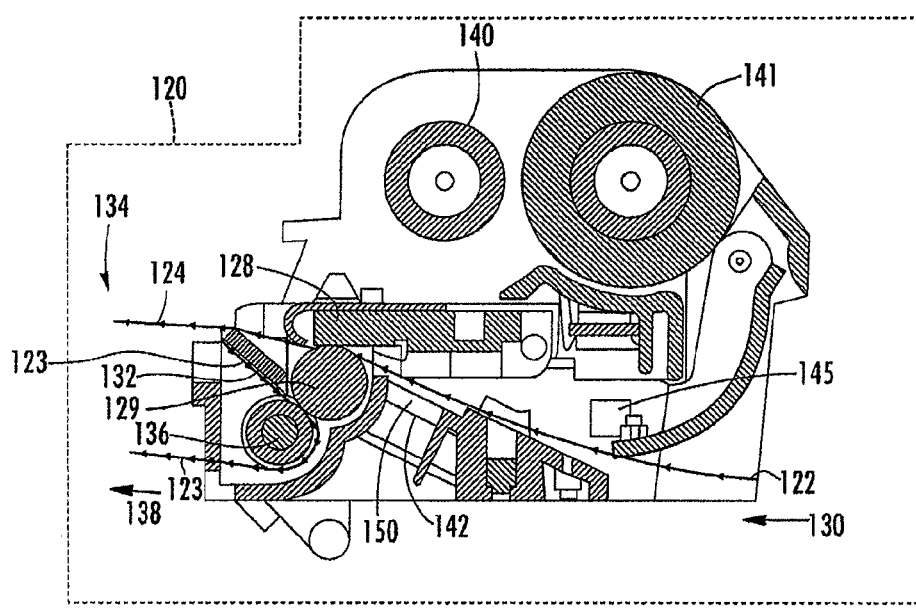
FIG. 1 is a side schematic view of a printer-encoder according to an embodiment of the present invention.
Figure 3A:
FIG. 3a illustrates an example of a large dipole-type transponder.
Figure 3B:
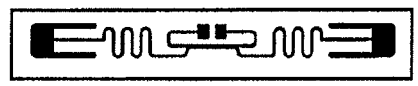
FIG. 3b illustrates another example of a long and narrow dipole-type transponder.
Figure 3C:
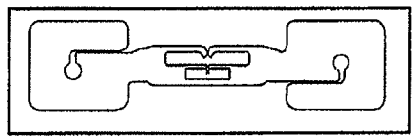
FIG. 3c illustrates another example of a long and narrow dipole-type transponder.
Figure 3D:
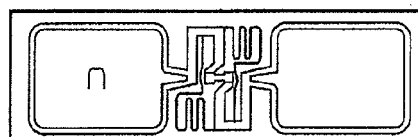
FIG. 3d illustrates another example of a long and narrow dipole-type transponder.
Figure 3E:
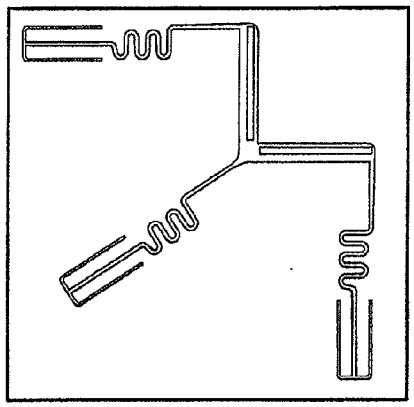
FIG. 3e illustrates an example of a large two port IC dipole-type transponder.
Figure 3F:
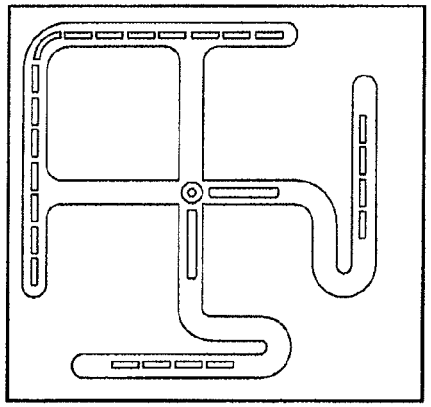
FIG. 3f illustrates another example of a large two port IC dipole-type transponder.
Figure 4A:
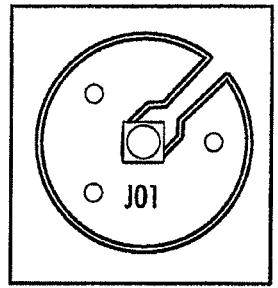
FIG. 4a illustrates an example of a small loop-type transponder.
Figure 4B:
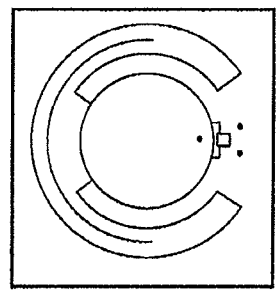
FIG. 4b illustrates another example of a small loop-type transponder.
Figure 4C:
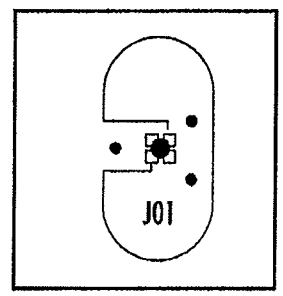
FIG. 4c illustrates another example of a small loop-type transponder.
Figure 4D:
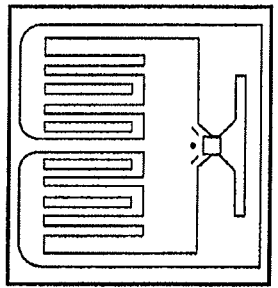
FIG. 4d illustrates another example of a small dipole-type transponder with an impedance matching loop.
Figure 4E:
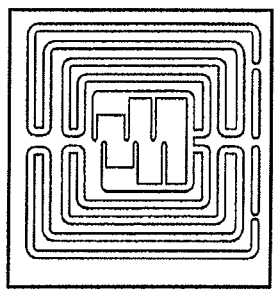
FIG. 4e illustrates another example of a small dipole-type transponder with an impedance matching loop.
Figure 4F:
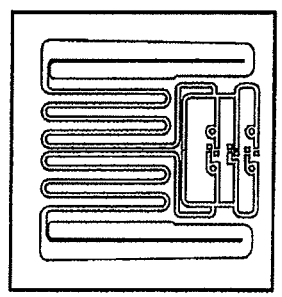
FIG. 4f illustrates yet another example of a small dipole-type transponder with an impedance matching loop.

FIG. 1 illustrates an example of a RFID printer-encoder 120 structured for printing and encoding a series or stream of media units 124. The printer-encoder 120 includes several components, such as a printhead 128, a platen roller 129, a feed path 130, a peeler bar 132, a media exit path 134, rollers 136, a carrier exit path 138, a ribbon take-up spool 140, a ribbon supply roll 141, a reader 142, a controller 145, and an encoding element 150 (also sometimes referred to herein as a "coupling device").

As noted above, media units may include labels, cards, etc., that are carried by web 122, which may be, e.g., a substrate liner. The web 122 is directed along the feed path 130 and between the printhead 128 and the platen roller 129 for printing indicia onto the media units 124. The ribbon supply roll 141 provides a thermal ribbon (not shown for clarity) that extends along a path such that a portion of the ribbon is positioned between the printhead 128 and the media units 124. The printhead 128 heats up and presses a portion of the ribbon onto the media units 124 to print indicia. The take-up spool 140 is configured to receive and spool the used ribbon. This printing technique is commonly referred to as thermal transfer printing. However, several other printing techniques may be used including, but not limited to, direct thermal printing, inkjet printing, dot matrix printing, and electro-photographic printing.

After printing, the media unit web 122 proceeds to the media exit path 134 where the media units are typically individually removed from the web 122. For example, in one embodiment, pre-cut media units 124 may be simply peeled from the web 122 using the peeler bar 132 as shown. In other embodiments, a group of multiple media units may be printed together and transmitted downstream to an in-line cutter for subsequent separation (not shown). Various other known media unit removal techniques may be used as will be apparent to one of ordinary skill in the art.

In applications, such as the depicted embodiment, in which the media units 124 are supported by a web 122, the web 122 may be guided along a path toward the carrier exit path 138 by rollers 136 or other devices after being separated from the media units. Structures that perform techniques for conveying or guiding the web of media units along the entire feed path of the printer-encoder are sometimes referred to herein as conveyance systems. The reader 142 is configured to generate and transmit RF communication signals that are broadcasted by the encoding element 150 located proximate the media feed path 130. For purposes of the present specification, the reader 142 and the encoding element 150 may be referred to collectively as forming at least part of a communication system. As will be explained in more detail below, the communication system can be configured to transmit one or more electromagnetic waves for establishing a mutual coupling, such as a wireless communications path, between the reader and a targeted transponder of a media unit that is located in the transponder encoding area, such that data may be read from and/or written to the media's transponder. As such, reader 142 can be used as a means for transforming electrical signals into wireless electromagnetic signals, which can be used to program a media's transponder(s) with computer readable data, similar to how a conventional printhead is used to transform electrical signals into printed words that are human-readable. Reader 142 can also be used as a means for reading data stored in the media's transponder(s), similar to how a bar code reader or scanner is able to transform barcodes printed on media into electrical signals and then interpret the meaning of electrical signals.

Each electromagnetic wave (used to, e.g., establish the mutual coupling) has different signal strengths depending on the distance from the encoding element. The strength in the near-field usually differs from the strength of the far-field. In general, the far-field of the encoding element is often too weak to activate or communicate with any of the transponders, while the near-field of the encoding element is usually strong enough in the transponder encoding area such that it only activates the media's transponder in the transponder encoding area.

In general, the reader is a device configured to generate, receive and process electrical communication signals. One skilled in the art would appreciate that similar devices, including various transmitters, receivers, or transmitter-receivers, may be used within embodiments of this invention. "Reader" as used herein refers to the devices noted above and to any other device capable of generating, processing, or receiving electrical and/or electromagnetic signals. For example, a reader may be a combination of a receiver and a transmitter.

Encoding Element

FIGS. 2a and 2b illustrate an exemplary embodiment of the encoding element 150. According to this embodiment, the encoding element 150 is based on a terminated uniform stripline transmission line that forms a loop. The encoding element 150 has a layered structure comprising a first conductive layer 254 (sometimes referred to herein as the ground layer 254), a first dielectric substrate 256, a conductive strip 252, a second dielectric substrate 258, and a shield 260. Together the conductive strip 252 and the ground layer 254 (which may have a co-centered hole) define a transmission line 255.

More specifically, according to the illustrated embodiment of FIGS. 2a and 2b, the ground layer 254 has a first surface and a second surface. The first dielectric substrate 256 has a first surface and a second surface. The first surface of the first dielectric substrate 256 is adjacent to the second surface of the ground layer 254. The conductive strip 252 also has a first surface and a second surface. The first surface of the conductive strip 252 is adjacent to the second surface of the first dielectric substrate 256. The second dielectric substrate 258 has a first surface and a second surface. The first surface of the second dielectric substrate 258 faces the second surface of the first dielectric substrate 256 and is adjacent to the second surface of the conductive strip 252. The shield 260 has a first surface and a second surface. The first surface of the shield 260 faces and is adjacent to the second surface of the second dielectric substrate 258.

As best seen on FIG. 2a, according to this embodiment, the shield has a general split-ring shape that generally corresponds to the portion of the conductive strip 252 shaped as a loop. For example, the shape and the positioning of the shield 260 is such that the portion of the conductive strip 252 shaped like a loop extends directly between the shield 260 and the ground layer 254 and the portion of the conductive strip 252 shaped like a loop and the shield 260 are generally concentric. The portion of the conductive strip 252 shaped like a loop may extend generally underneath (or above, depending on the orientation of the encoding element 150) a centerline of the shield 260. The shield 260 may be connected to the ground layer 254 through one or more connections. For example, in the illustrated embodiment of FIGS. 2a and 2b, the encoding element 150 includes a plurality of vias 266 extending along the inner and outer edges of the shield 260 to the ground layer 254. As shown, the shield 260 provides a central open area 261 intended to facilitate the propagation of the magnetic fields from the conductive strip 252 at the center of the encoding element 150. Moreover, the placement of the shield 260 helps to suppress the electric field above the conductive strip 252 while being transparent for the magnetic field. Also, the shield 260 helps to protect the encoding element 150 from external electric field interferences.

The dielectric substrates 256, 258 may be made or constructed from various dielectric materials, including but not limited to, plastics, glasses, ceramics, or combinations such as Rogers materials, Isola materials, or woven glass reinforced epoxy laminate, such as those commonly referred to as "FR4" or flame resistant 4. As another example, the dielectric material may be air. Therefore the ground layer 254 and the shield 260 may be spaced apart from each other and have only air and the conductive strip 252 between them. One skilled in the art would appreciate that these various materials may be used to achieve an appropriate transmission line 255 characteristic impedance for a specific dielectric constant.

As explained in more detail below, the transmission line 255 provides a conductive plane for the propagation of electromagnetic waves from the encoding element 150 to a targeted transponder (not shown in FIG. 2A or 2B). As examples, the conductive material of the conductive strip 252 and the ground layer 254 may be copper, gold, silver, aluminum or combination thereof, or doped silicon or germanium. The conductive strip 252 extends from a first end 262 to a second end 264. As mentioned, the conductive strip 252 forms a loop like shape. The length of the conductive strip 252 is defined by the distance from the first end along the conductive strip 252 to the second end. The ground layer 254 may have various shapes. For example, the ground layer 254 may be generally rectangular and correspond to the overall shape of the encoding element or follow the shape of the conductive strip.

The methods of fabricating the encoding element(s), including the transmission line(s) 255 may vary. For example, the dielectric substrate may include a cut out area where the area above the cut out is the first dielectric substrate and the area below the cut out is the second dielectric substrate. In this type of embodiment, the conductive strip 252 may be inserted into the cut out area such that it is between the first and second dielectric substrates 256, 258. As another example, the conductive strip 252 may be deposited directly (e.g., printed or etched) onto either the second surface of the first dielectric substrate 256 or the first surface of the second dielectric substrate 258.

The first end 262 of each conductive strip is connected to an input and output port 268 of the encoding element. The second end 264 is connected to a terminating load 270 of the encoding element. The terminating load 270 may be equal to a system impedance. The input and output port 268 connects the reader to the encoding element. For example, each input port and output port may be a radio frequency port ("RF port"). In particular, the reader can be configured to send an electrical signal to the encoding element through the input and output port 268. The signal passes through the input and output port 268, the conductive strip 252, and into the terminating load 270, which is connected to the ground layer 254 or is otherwise grounded.

As the electrical signal passes through the transmission line 255, the transmission line 255 does not operate as a conventional radiating antenna. But rather the passing signal in the transmission line 255 generates magnetic fields concentrated in the near field region of the transmission line 255. The magnetic fields may be adapted to couple the reader (through the encoding element 150) to a transponder disposed proximate the encoding element 150, referred to herein as the transponder encoding area. Additional examples of the magnetic flux generated by encoding elements are show in and discussed in connection with FIGS. 11B and 11C. Further description of the magnetic and electric fields concentrated in the near field region, also known as "leaky" electromagnetic fields, is provided in commonly owned U.S. patent application Ser. No. 12/463, 841, U.S. Patent Application Publication Nos. 2007/ 0262873 and 2007/0216591 U.S. Pat. No. 7,398,054 to Tsirline et al., which are each hereby incorporated by reference in its entirety.

According to another embodiment, the characteristic impedance of the transmission line 255 may be configured to be equal to the terminating load and the system impedance. In such an embodiment, the RF port impedance equals the terminating load 270 and the system impedance, e.g., 50 ohms, independent from the length of the transmission line and allows for the widest possible bandwidth. The RF port may also have a standing wave ratio of less than or equal to 2 (i.e., VSWR≤2) in a wide frequency band covering spectrum requirements for RFID applications in various jurisdictions (e.g., in EU, U.S. and JP, which is 860-960 MHz). Moreover, in such an embodiment, the magnetic field strength is evenly distributed along the length of the transmission line.

U.S. Patent Application Publication Nos. 2007/0262873 and 2007/0216591 and U.S. Pat. No. 7,398,054 to Tsirline et al. disclose among other things, using a microstrip or stripline linear transmission line or lines as a near-field antenna. Although near-field antennas based on a linear microstrip or a stripline transmission line may be adequate for the encoding of certain types of media units within certain types of printer-encoders, such near-field antennas may have limitations.

More specifically, FIGS. 3a through 3f illustrate examples of a first category of transponders referred to as long and narrow or large dipole-type transponders due to the structure of the antennas of the transponders. FIGS. 4a through 4f illustrate examples of a second category of transponders referred to as an item-level or a small loop-type transponder due to the structure of the antennas of the transponders. Terms such as "long and narrow", "large" and "small" as used herein are intended to indicate the relative size of the transponders compared to an operational wavelength of the transponder or compared to its relative dimensions. As examples, the large dipole-type may be about 3 inches long (i.e., the largest dimension of the dipole-type) and may be about 0.3-0.6 inches wide and the small loop-type may be about 1 inch long and 1 inch wide.

In many systems, a near-field antenna, as an electric field exciter, based on a microstrip or stripline transmission line is generally placed cross-wise relative to the feeding path or feeding direction, such that length of the active conductive strip of the near-field antenna is orthogonal to the feeding path or feeding direction. The alignment of the media units within the printer-encoder may be referred to as either edge-justified (also sometimes referred to as side-justified) or center-justified. In an edge-justified system, the media unit is positioned near or aligned with one of the ends of the conductive strip of the near-field antenna regardless of the relative sizes of the media unit and the near-field antenna. In a center justified system, the media unit is positioned proximate to the center of the conductive strip of the near-field antenna regardless of the relative sizes of the media unit and the near-field antenna. Typically, the transponder of the media unit is centered relative to the media unit. Therefore the alignment of the media unit to the antenna may also coincide with the alignment of the transponder to the transponder. As examples, the width of the media unit may be 1", 1.5", 2", 3", 4", or more.

In general, microstrip and stripline electric field source antennas have a limited RF power efficiency because their electric field distribution is concentrated between the conductive strip and the ground planes, and the field strength above the conductive strip is relatively weak. When the characteristic impedance of the microstrip or stripline is lower than a terminating load then the maximum strength of the magnetic field component emitting from the conductive strip of a stripline or microstrip near-field antenna is at the center of the conductive strip and the maximum strength of the electric field component emitting from the conductive strip of a stripline or microstrip near-field antenna is at the ends of the conductive strip. When the characteristic impedance is higher than the terminating load, then the maximum strength of the magnetic field component is at the ends of the conductive strip and the maximum strength of the electrical field component is at the center of the conductive strip. The distribution of electric and magnetic field components for microstrip and stripline transmission lines is further discussed in detail in "UHF RFID Antennas for Printer-Encoders-Part 1: System Requirements", High Frequency Electronics, Vol. 6, No. 9, September 2007, pp. 28-39 which is authored by one of the inventors of the present application and is hereby incorporated by reference in its entirety.

Therefore, in a center justified system processing large dipole-type transponders, the electric and magnetic field components from the near-field antenna can be configured to be optimally aligned with the center of the transponder to facilitate reliable communication between the transponder and the reader through the near-field antenna. In some instances, a large dipole-type transponder may be large enough relative to the near-field antenna that even in an edge-justified system the transponder is close enough to the center of the conductive strip not to make a significant difference in the near-field antenna's ability to communicate with the transponder in the edge-justified system compared to a center justified system.

However, for small loop type transponders, a linear stripline or microstrip near-field antenna may by incapable of providing reliable communication with transponders at a desired or acceptable power level depending on whether the system is edge-justified or center-justified.

In a center-justified system, although relatively small compared to the operating wavelength of the microstrip near-field antenna, the loop-type transponder may be generally aligned with the center of the microstrip near-field antenna, where the magnetic field strength is the greatest. Such an alignment allows for reliable communication at an acceptable power level.

In an edge justified system, the transponder may be off-set from the center of the near-field antenna such that communication between the transponder and the near-field antenna may require relatively higher power levels because the transponder is not over the area of the near-field antenna where the magnetic field strength is the greatest (indeed in some cases, the transponder may be over the area of the near-field antenna where the magnetic field strength is the weakest). Further discussion regarding types of coupling devices or encoding elements, types and placement of transponders and calibrating the same are provided in the following commonly-owned patents and published application: U.S. Pat. Nos. 7,398,058, 7,190,270, and 7,489,243 and U.S. Publication Nos. 2005/0274799 and 2009/0008448. Each of the foregoing is hereby incorporated by reference in its entirety.

Figure 5:
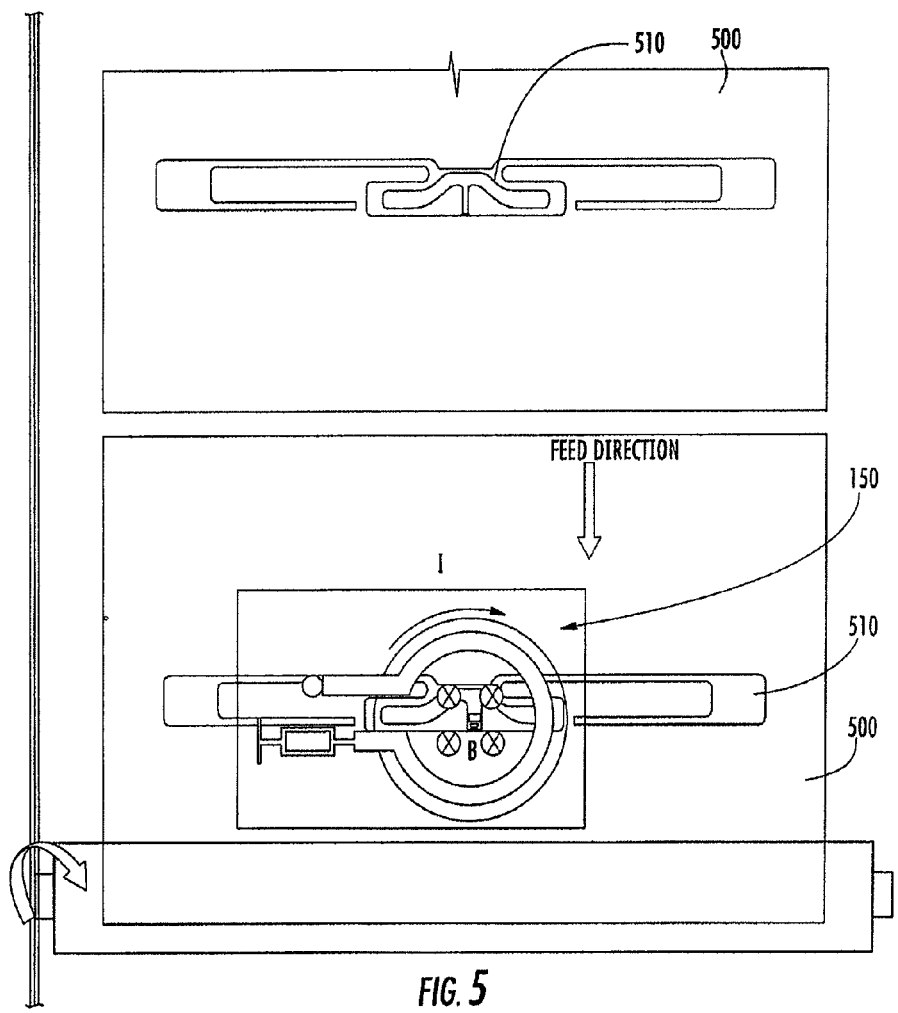
FIG. 5 is a simplified top view of a co-centered long and narrow dipole-type transponder and an encoding element in a center-justified label positioning printer system.
Figure 6:
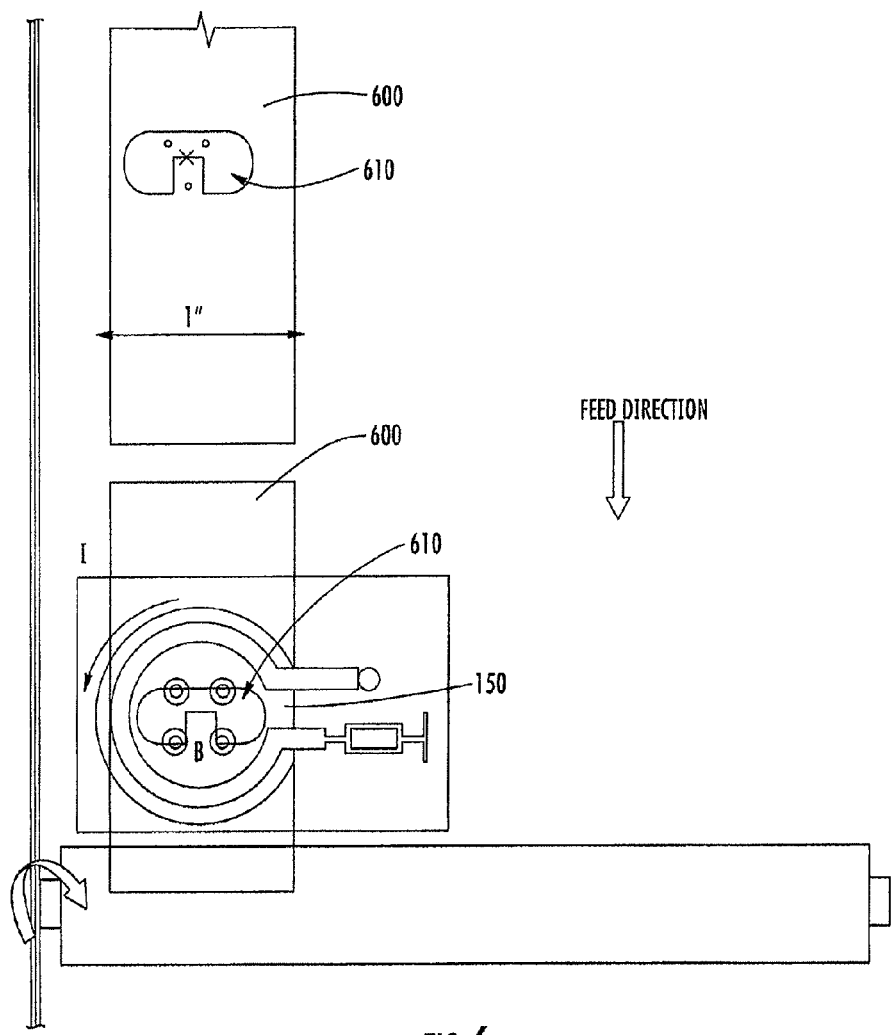
FIG. 6 is a simplified top view of a co-centered small loop-type transponder and an encoding element in an edge justified label positioning printer system.

The embodiment illustrated in FIGS. 2a and 2b may be positioned within a printer-encoder or other RFID system to communicate with either type of transponder types. The loop shape of the conductive strip is configured to create a highly concentrated (e.g., high magnetic flux density β) at the center of the conductive strip, i.e., above the central open area 261 of the shield. As shown in FIG. 5, in a center justified system, the encoding element 150 may be positioned within the printer-encoder (i.e., substantially centered along the feed path) such that it is substantially aligned with the center of the large-dipole type transponders 510 as the media units 500 pass over the encoding element 150, where a large-dipole type transponder is the most sensitive to magnetic fields. As shown in FIG. 6, in an edge-justified system, the encoding element 150 may be positioned within the printer-encoder (e.g., along an edge of the feed path) such that it is substantially aligned with the center of the small loop-type transponders 610 as the media units 600 pass over the encoding element 150, where a small loop-type transponder is the most sensitive to magnetic fields.

The center to center alignments in both a center justified system and in an edge-justified system, allows for reliable communication at an acceptable power level between the reader and the transponder via the encoding element. Acceptable power levels may be determined based on one or more factors including, but not limited to, the power level available from the reader and regulations or laws limiting maximum power levels. Moreover, rather than focusing on a particular power level, one factor that may be considered is relative power levels, i.e., whether the encoding element from its position can communicate successfully with the transponder at a power level compared to other positions or other types of encoding elements.

Figure 7A:
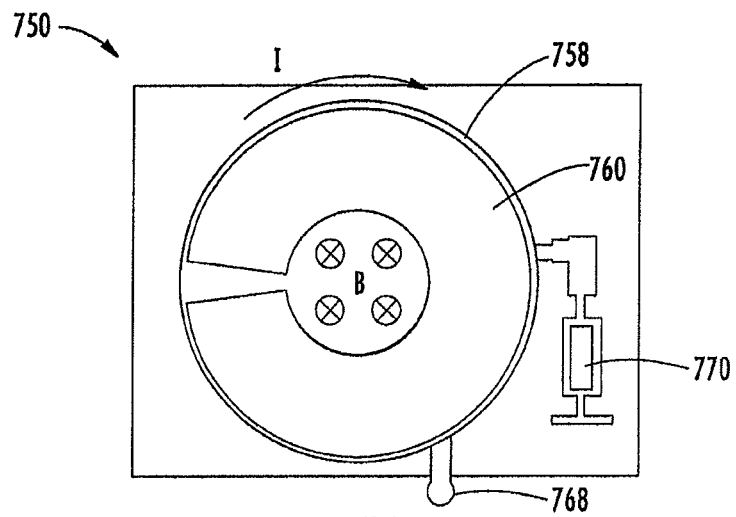
FIG. 7a is a top view of an encoding element consistent with another exemplary embodiment.
Figure 7B:
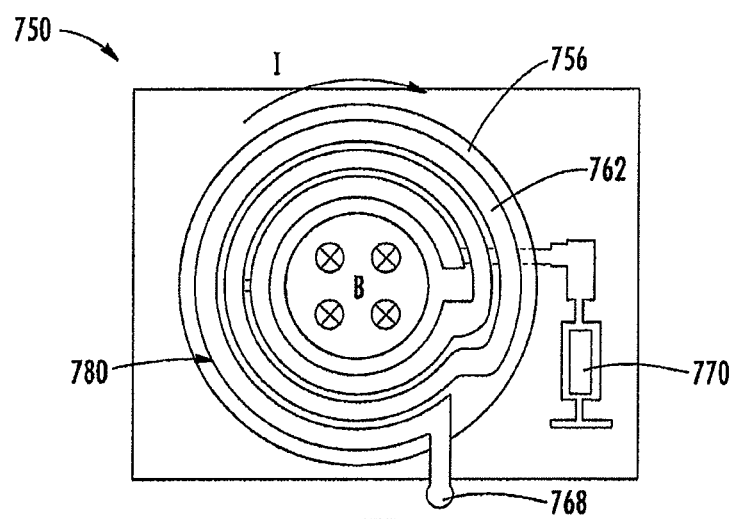
FIG. 7b is the view of FIG. 7a with the shield and the top dielectric substrate not illustrated in order to make the conductive strip 762 visible.
Figure 8A:
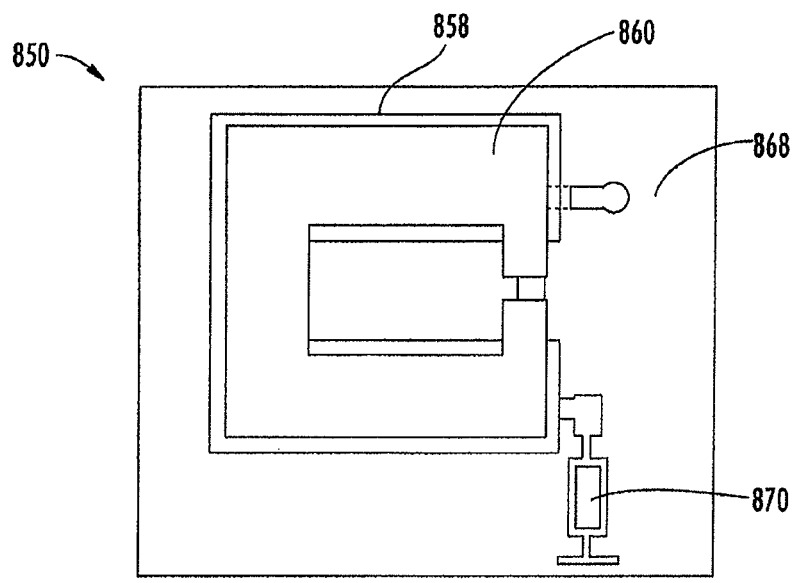
FIG. 8a is a top view of an encoding element consistent with yet another exemplary embodiment.
Figure 8B:
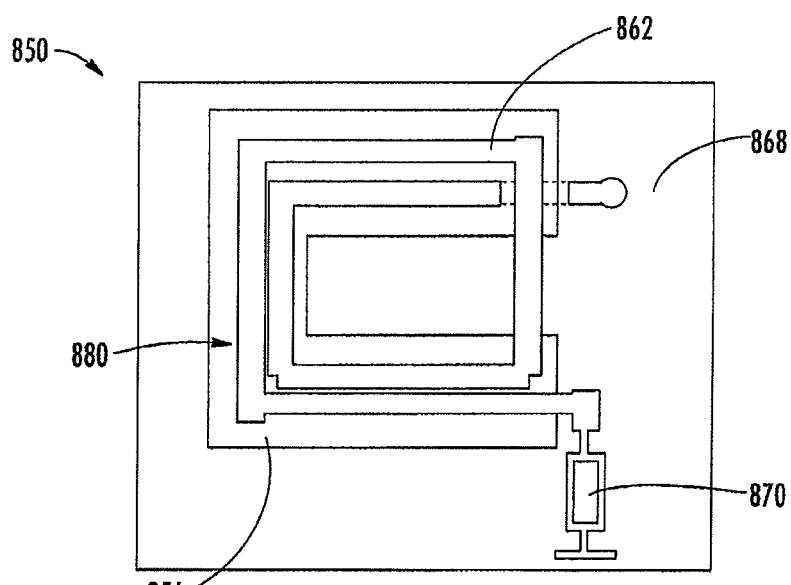
FIG. 8b is the view of FIG. 8a with the shield and the top dielectric substrate not illustrated in order to make the conductive strip 862 visible.

In some embodiments, rather than the conductive strip 762 having one portion shaped as one loop, the encoding element 750 may include a spiral shape 780 (or, more specifically, an Archimedean spiral) such as illustrated in FIGS. 7a and 7b. In yet other embodiments, rather than having a strictly "circular" shape, the loops of the conductive strip 862 may be rectangular in shape 880 such as illustrated in FIGS. 8a and 8b. In the embodiments having a plurality loop shapes, the encoding element 750, 850 may include an input port 768, 868, a terminating load 770, 870, dielectric substrate(s) 756, 758, 856, 858, a ground plane (not visible in the drawings), and a shield 760, 860 as described above for the single loop embodiment.

The embodiments of FIGS. 7a, 7b, 8a and 8b include a plurality of loop shapes that are substantially coplanar and concentric. The embodiment of the encoding element 950 illustrated in FIG. 9 includes a conductive strip 952 shaped to have at least two loop shaped portions 980, 982 spaced apart. The two loop shaped portions 980, 982 of the conductive strip 952 may be coplanar. The first loop shaped portion 980 may be positioned such that the center of the first loop shaped portion 980 is aligned with the center of a small loop-type transponder that is edge justified as the small loop-type transponder travels over the encoding element 950 while the second loop shaped portion 982 may be positioned such that the center of the second loop shaped portion 980 is aligned with the center of a large dipole-type transponder that is center justified as the large dipole-type transponder travels over the encoding element 950. Therefore, the encoding element 950 may be configured to communicate with either an edge-justified small loop-type transponder or a center-justified large dipole-type transponder.

Figure 10:
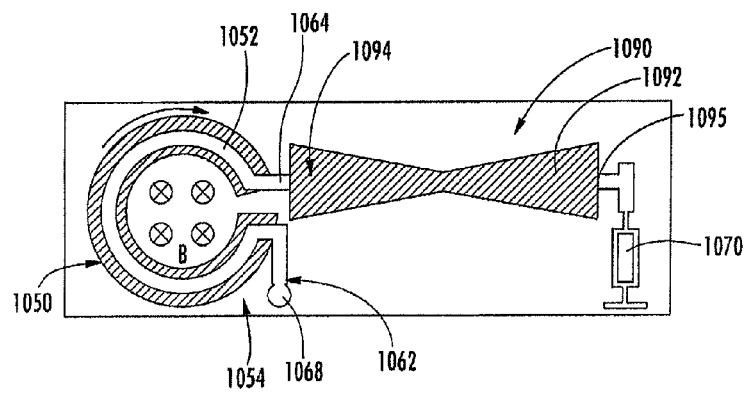
FIG. 10 is a top view of a first encoding element in combination with a second encoding element based on a microstrip transmission line (TL) according to exemplary embodiment.

FIGS. 10 and 11A-C illustrate other exemplary embodiments. The encoding element described above may be combined with other types of encoding elements or antenna-couplers using, for example, a cascaded connection or connections. As an example, FIG. 10 illustrates a first encoding element 1050 that is a magnetic exciter having the conductive strip 1052 that includes a loop-shaped portion 1054 and a second encoding element 1090 that is an electric exciter based on a one half wavelength, or other multiple thereof, tapered microstrip 1092. Embodiments of a second encoding element or antenna coupler 1090 based on the tapered microstrip 1092 is further disclosed in U.S. Patent Application Publication No. 2007/0216591, which as stated above is incorporated by reference. In the embodiment illustrated in FIG. 10, the combination of the first encoding element 1050 and second encoding element 1090 includes an RF port 1068 in communication with a first end 1062 of the conductive strip 1052 of the first encoding element. The second end 1064 of the conductive strip 1051 of the first encoding element is in communication with a first end 1094 of the tapered microstrip 1092 of the second encoding element. The combination further includes a terminating load 1070 in connection with a second end 1095 of the tapered microstrip. As an example, this particular combination enables encoding of media units having the following widths 1", 3", and 4" media units.

Figure 11A:
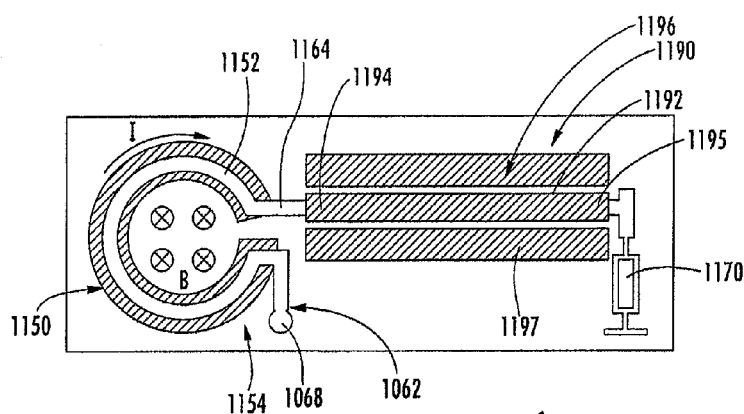
FIG. 11A is a top view of a first encoding element in combination with a second encoding element based on a coplanar wave guide (CWG) according to another exemplary embodiment.

As another example, FIG. 11A illustrates a combination of a first encoding element 1150 that is a magnetic exciter having the conductive strip 1152 that includes a loop-shaped portion 1154 and a second encoding element 1190 that is an electric exciter. As a more specific example, the second encoding element may be a coplanar wave guide. A coplanar wave guide includes a conductive strip 1192 and two ground planes 1196, 1197 and is further disclosed in commonly owned U.S. patent application publication number US2009/0152353, entitled "RFID Near-Field Antenna and Associated Systems" and filed on Dec. 18, 2007 to Tsirline et al., which is hereby incorporated by reference in its entirety. In the embodiment illustrated in FIG. 11A, the combination of the first and second encoding elements 1150, 1190 includes an input RF port 1168 in communication with a first end 1162 (e.g., the input end) of the conductive strip 1152 of the first encoding element. A second end 1164 (e.g., the loaded end) of the conductive strip 1152 of the first encoding element is in communication with a first end 1194 (e.g., the input end) of the coplanar waveguide 1190. The combination further includes a terminating load 1170 in connection with a second end 1195 (e.g., the loaded end) of the coplanar waveguide 1190. As an example, this particular combination enables encoding of media units having the following widths: 1", 2", 3" and 4".

The above embodiments relate to a coupler device having a terminated loop shape portion which differs from conventional loop antennas. For example, the above embodiments are terminated with a terminating load while conventional loop antennas for UHF and above frequency bands are open-ended. As another example, the above embodiments provide for mainly magnetic coupling with transponders, e.g., UHF transponders, and have a relatively low susceptibility to a metal-dielectric environment of printer-encoders or other similar systems. Conventional UHF loop antennas rely mainly on close proximity electro-magnetic coupling with a transponder and are more susceptible to a metal-dielectric environment.

Common to both FIGS. 10 and 11A, a transmission line (second encoding element 1090 of FIG. 10 and second encoding element 1190 of FIG. 11A), is terminated at one end by the terminating load 1070 and 1170, respectively. The terminating load 1070, 1170 may be configured for RF port impedance matching. For example, loop type couplers, example of which are first encoding element 1050 of FIG. 10 and first encoding element 1150 of FIG. 11A, can have a characteristic impedance equal to system impedance of the second encoding element, load impedance, and reader RF port impedance. At the center operating frequency, the input impedance of first encoding element 1050, 1150 at a first end of a transmission line of second encoding element 1090, 1190 that has a length (i.e., measured from the first end to a second end of second encoding element 1090 or 1190) of one half wavelength, or a multiple thereof, is substantially equal to the terminating load 1070, 1170, regardless of the characteristic impedance of the transmission line of second encoding element 1090, 1190. Therefore, in some embodiments, the length of the transmission line of second encoding element 1090, 1190 may be one half wavelength, or multiple thereof (i.e., the length may substantially equal $N*\lambda/2$, wherein N may equal 1, 2, 3, 4, 5, . . . ) and the terminating load 1070, 1170 may be configured to match the source impedance in order to substantially match the source impedance and/or the input impedance.

Although the relationship between the characteristic impedance of the transmission line of second encoding element 1090 or 1190 and the terminating load 1070, 1170 impedance may vary, according to an embodiment, the characteristic impedance distribution may be configured to maximize the magnetic field at the center of the conductive strip of first encoding element 1050, 1150. Further, terminating the transmission line of second encoding element 1090 or 1190 with a terminating load 1070, 1170 that is substantially equal to the source impedance and greater or lower than the characteristic impedance of the transmission line of second encoding element 1090 or 1190 forms a band-pass filter.

In some embodiments, the characteristic impedance of the transmission line of second encoding element 1090 or 1190 may be principally equal to the impedance of the reader and the terminating load 1070, 1170 thus the encoding element may have a wide bandwidth and capability of tolerating mechanical and electrical parameter deviations. In conventional loop antennas, such as first encoding element 1050, 1150, typically a mismatched port impedance exists or requires a matching network and/or narrow bandwidth. Above embodiments may comprise a shield. The shield can function as one of the two ground layers of the modified stripline transmission line, which decreases parasitic radiations and is transparent to a magnetic field.

Generally, conventional loop antennas are open, highly radiation efficient, and have non-localized fields and consequentially have no spatial selectively to communicate with a targeted transponder positioned among a group of multiple adjacent transponders. Embodiments of the resonant loop encoding element, such as in HF (e.g., at or about 13.56 MHz) and lower systems, may be arranged in parallel and co-centered alignment with a targeted transponder to provide high mutual inductance and coupling, highly localized magnetic flux to or around the targeted transponder while the coupling effect (e.g., grade, depth, etc.) with adjacent transponders is significantly lowered. When creating a matrix structure for a HF encoding module, the encoding elements can comprise resonant circuits formed by a coil (or traces on PCB), frequency tuning and impedance matching capacitors, and resistors, some examples of which are discussed in commonly-assigned U.S. Patent Application Publication No. 2008/0298822, filed May 30, 2007, No. 2008/0298870, filed May 30, 2007, No. 2008/0117027, filed Nov. 16, 2007, and U.S. Pat. No. 7,137,000, filed Jun. 6, 2002, which are incorporated herein by reference in their entireties. Therefore this arrangement and encoding element may provide both high spatial selectivity and high RF power margin inside a transponder encoding region in which the power delivered to a targeted transponder exceeds an activation power threshold of the targeted transponder. In addition, the power delivered to the transponders located outside the transponder encoding region can be less then the activation power threshold of adjacent transponders. These features in a conventional UHF loop antenna are lacking. In general, to limit an encoding range, a conventional loop antenna should be weakly coupled with the targeted transponder and/or be fed by reduced RF power from the reader. The former referenced approach dictates an increase of RF power that in turn creates an issue of communicating with multiple adjacent transponders at once. The latter referenced approach runs the risk of lower encoding yield, because an RFID system has a low power margin and is unable to compensate for the negative effect(s) of an antenna and variables associated with the transponders electrical parameters.

Figure 11B:
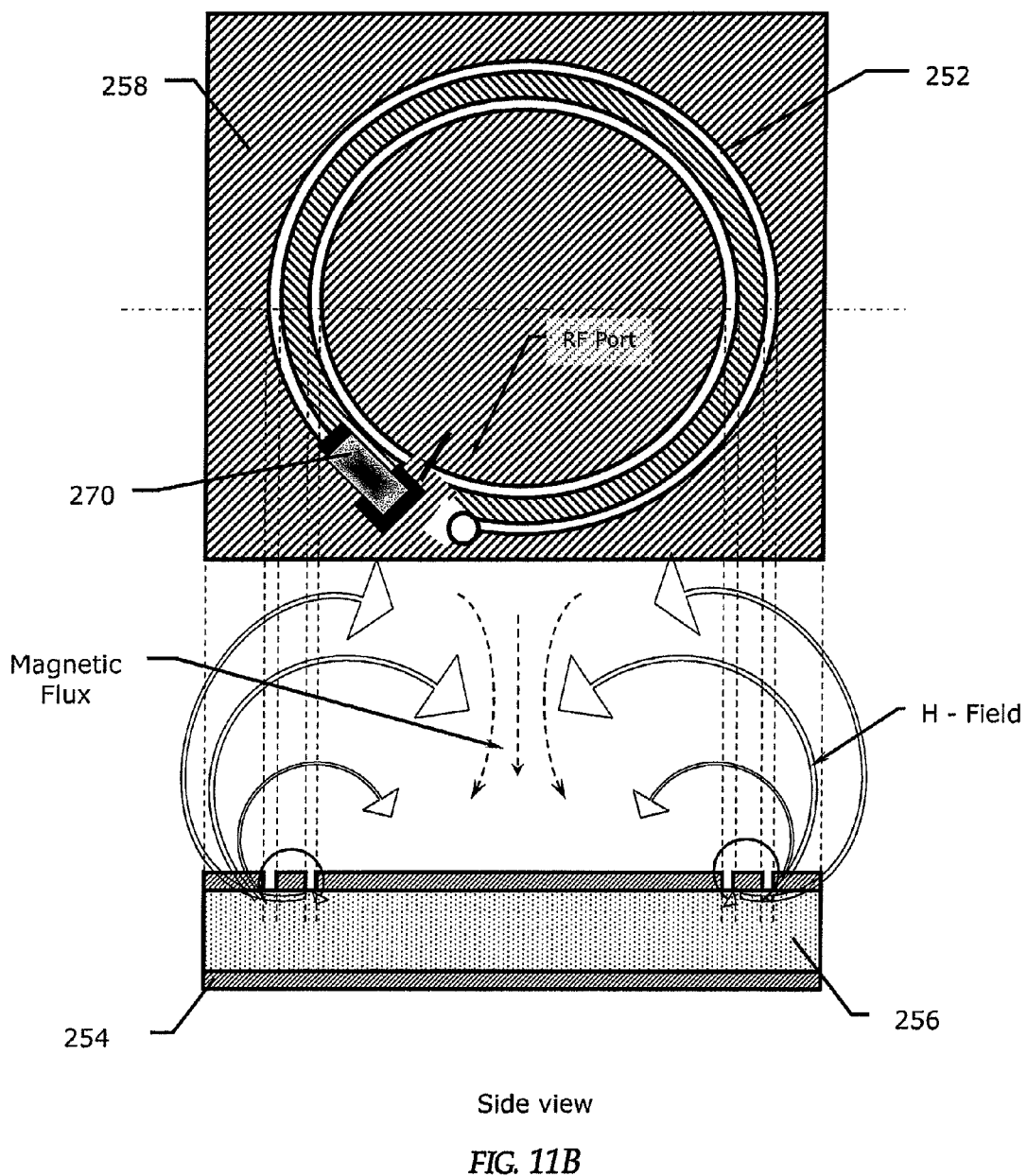
FIG. 11B is a top view and a side view of a CWG encoding element that shows the electro-magnetic flux lines created when the CWG encoding element is active.
Figure 11C:
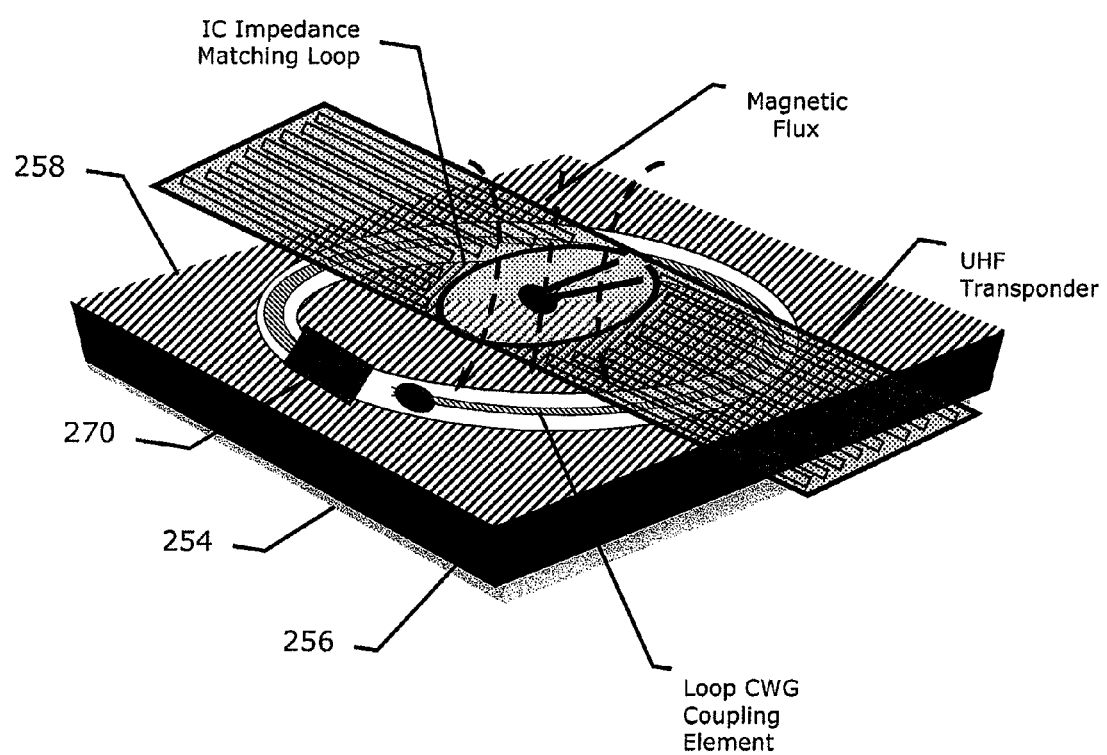
FIG. 11C is an isometric view of a CWG encoding element and transponder that shows the electro-magnetic flux lines created when the CWG encoding element is active.

Further to the discussions related to FIGS. 11A, 2A and 2B, FIGS. 11B and 11C show the magnetic flux generated by a UHF CWG encoding element that magnetically couples to a transponder. As shown in FIGS. 11B and 11C, there is maximum sensitivity to magnetic fields at the center of the encoding element's loop. Many UHF encoding elements, regardless of whether they are dipole or loop type, have an impedance matching element between the antenna and the integrated circuit. The impedance matching element (as discussed elsewhere herein) is often a conductive loop, which allows for magnetic coupling between the closely spaced transponder and antenna of the Reader's UHF RFID coupling element. Even when a dipole type's antenna is directly attached to the integrated circuit, the maximum sensitivity to a magnetic field is at its center. In RFID applications (e.g., RFID printer-encoders, access control systems, item-level RFID conveyor tracking systems, etc.) where the UHF transponder's antenna is in close proximity to the encoding element, the characteristics of the electrical coupling is similar to those of HF RFID magnetically coupled devices.

To create a miniature magnetic encoding element, a coplanar waveguide (CWG) can be banded to form a loop (as discussed above and shown in FIGS. 11B and C). The shape of the look can assume different profiles (as discussed above in connection with, e.g., FIGS. 2-3) and be, for example, a square loop, a rectangular loop, an elliptical loop, etc. The loop's characteristic impedance can be configured to be equal to the termination load's impedance (as shown in FIG. 11B) and the system's impedance, which can be 50 ohms. Accordingly, the magnetic field generated by the CWG encoding element can be evenly distributed. The RF port can have a VSWR≤2 in a wide frequency band that can cover spectrum requirements for RFID applications in the European Union, United States and Japan (e.g., 800-960 MHz). FIG. 11C shows how a loop CWG encoding element can generate magnetic flux that intersects a transponder's loop area and achieve maximum strength when in co-centered alignment. Accordingly, the enabling element can be configured so that magnetic flux falls intensively in response to the co-centered alignment being skewed, thus allowing the system to maintain a high spatial selectivity when working with a plurality of adjacent transponders.

Encoding Module

In some embodiments, such as portable and compact printer-encoders or other systems, the encoding element may be near or approximate with the printline, i.e., the first point along the feed path in which the printhead is configured and positioned to print on the media unit. For example, the encoding element may be close enough to the printline that at least a part of the communication area for some types of transponders overlaps the printline, which may allow the system to encode the shortest possible labels or maintain the shortest pitch between labels. In other words, the system may be configured such that the system is printing indicia onto the media unit while it is interrogating or encoding the transponder of the same media unit. The close proximity of the encoding element and printhead may be necessary or desirable in order to maintain overall compact design of the system. It may also create a situation in which the interrogation or encoding of a transponder occurs in essentially the same space as any printing operations.

The minimum distance from the printline to the leading edge of a particular transponder, such as a targeted transponder, when the encoding element is able to communicate with that transponder is referred to herein as the "starting encoding distance." The distance from the starting encoding distance to the downstream point in which the encoding element is unable to communicate with the transponder is referred to herein as the "encoding range." It is believed that the starting encoding distance is defined by the characteristics of the transponder, such as its antenna, and the characteristics of the structure and components of the system near the printline, such as the platen roller and the printhead and that the encoding range is defined by the characteristics of the transponder and the encoding element.

As examples, the platen roller, the printhead, and other components may impact coupling between the transponder and the encoding element near the printline. More specifically, in some systems, along the feed path in which the metal-dielectric environment of the platen roller, the printhead, and other components prevents or otherwise interferes with communications between transponder and the reader.

The starting encoding distance may vary depending on the type of transponder being encoded. Also, as discussed above, in addition to the type of transponder, the relative location of the transponder on the media unit may vary. The encoding element may be specifically configured to have a limited range to selectively activate and provide communication with one transponder at a time. For example, according to the embodiment of FIGS. 2a and 3b, the encoding element is generally configured to activate and provide communication with a co-centered transponder directly above it (or below depending on the relative orientation of the system). This may be accomplished by configuring the encoding element to generate a magnetic flux that intersects a transponder's loop area, thereby achieving a maximum level for co-centered alignment. This flux intensively falls as soon as a transponder's loop is skewed from a center of the coupling element, thus maintaining a high spatial selectivity in relation to adjacent transponders. Therefore, the optimal location of the encoding element along the feed path may vary depending on the type and placement of transponder(s). See, e.g., FIGS. 11B and 11C above for additional examples and details regarding achieving a maximum level of magnetic flux through co-centered alignment of the encoding element and transponder.

However, it is typical that the encoding element or the coupling device of the system, such as a printer-encoder, is installed into the printer-encoder by the manufacturer or assembler prior to the loading and encoding of the transponders. Therefore, it is possible that the encoding element of the coupling device of the printer-encoder is in a less-than-optimal or unacceptable position to enable it to couple the reader and the transponder depending on the type and placement of the transponder. Also, some customers prefer to use the printer-encoder to process various types of media units that have different types and placement of the transponders.

Commonly-owned U.S. patent application Ser. No. 12/463,841 ("the '841 application") filed on May 11, 2009 to Tsirline et al., the entirety of which is hereby incorporated by reference, addresses this challenge by providing a multi-element coupling device in which the elements can be selectively connected or combined in order to adjust the distribution of an electromagnetic filed along the elements based on the type and placement of the transponder to be processed. Embodiments herein also may also address the same issue in addition to or rather than the approach disclosed in the '841 application.

Figure 12:
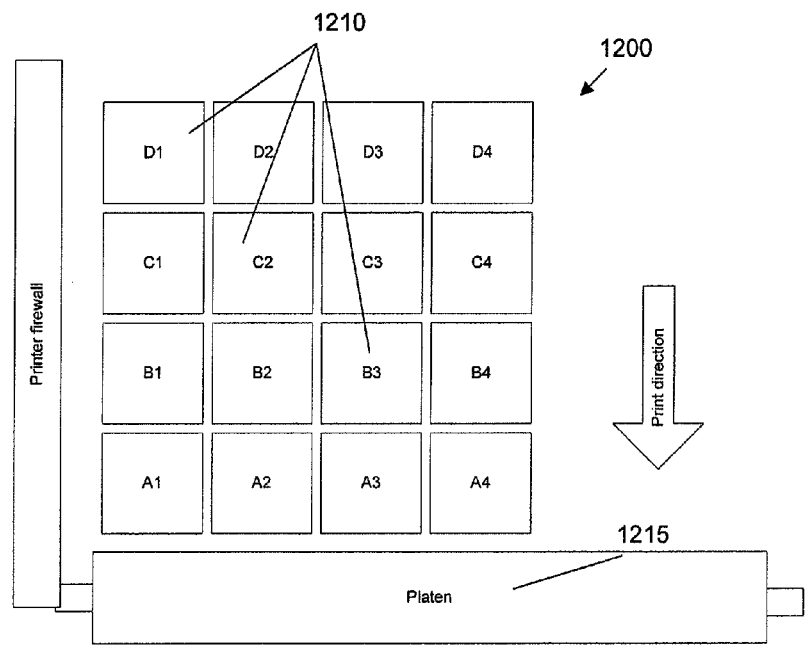
FIG. 12 is a top schematic view of an encoding module according to an embodiment.
Figure 13:
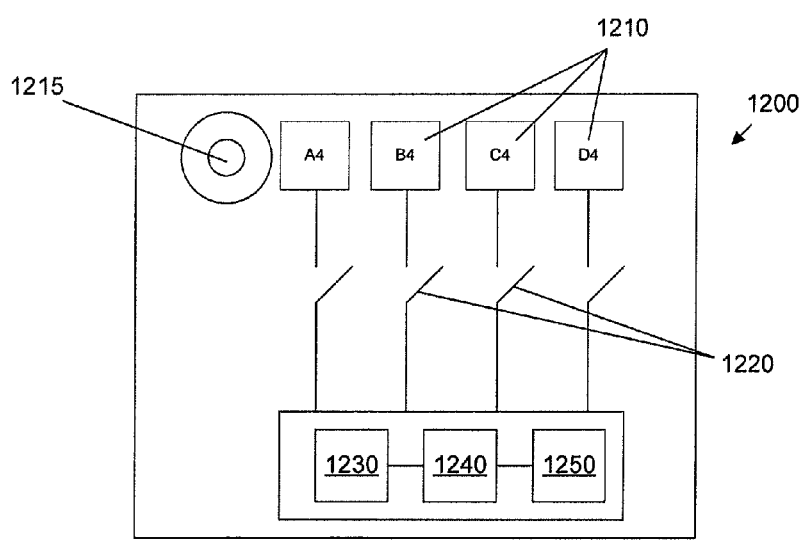
FIG. 13 is a side schematic view of the encoding module of FIG. 12

For example, according to an embodiment, such as the embodiment illustrated in FIGS. 12-13, an encoding module 1200 is provided that is configured to adjust to the type and location of the transponder on the media unit. The encoding module 1200 may include a plurality of encoding elements or elements 1210 forming an array. As discussed above, each encoding element 1210 may be configured to have a limited range such that each encoding element can selectively activate and communicative with one transponder at a time. As an example, each of the encoding elements of the encoding module for UHF band may be any of the encoding elements illustrated in FIGS. 2A-B and 7A-8B. As another example, each of the encoding elements of the encoding module for LF band may be a resonant multi-coil (loop) antenna tuned to an operational frequency and matched to the system impedance, such as 50 ohms. The encoding module 1200 may further include one or more switching elements 1220 (e.g., mechanical switches, transistors, PiN diodes, among other things). The switching elements 1220 are configured to selectively connect the encoding elements 1210 with the reader 1230. The term "connected" or "connect" as used herein refers to an encoding element being electrically coupled to the reader such that the encoding element provides unidirectional or bidirectional communication between the reader and the transponder.

During operations, the switching elements 1220 may be used to selectively connect an encoding element or devices to the reader. More specifically, a column and a row of encoding elements may be selected. As illustrated in FIG. 12, the plurality of encoding elements 1210 (e.g., A1, A2, A3, A4, B1, B2, . . . ) may be arranged in an array comprising a plurality of columns and rows. Each column (1, 2, 3, 4) may extend parallel to the feed path (i.e., be longitudinal relative to the feed path) and each row (A, B, C, D) may extend perpendicular to the feed path (i.e., be crosswise with respect to the feed path).

The selection of the encoding element (e.g., the column and row selection) may be based on, for example, the type and dimensions of the transponder, the placement of the transponder on the media unit, the location of the media unit in the system (e.g., edged or centered justified), the metal-dielectric environment within the system, among other things.

The column 1, 2, 3, 4 of encoding elements 1210 of the encoding module 1200 may be selected based on the location of the transponder relative to the edges or center of the feed path. For example, an encoding element 1210 of the innermost column 1 may be selected if the transponder 1400 is located over the innermost column, e.g., as illustrated in FIG. 14a. Similarly, an encoding element 1210 of a center column 2, 3 or the outmost column 4 may be selected if the transponder 1400 is located over or centered on one of those columns, e.g., as illustrated in FIGS. 14b and 14c.

As discussed above, the inventors' tests suggest that it is optimal, in terms of shortest media unit back feed, to encode the transponder as close to the printline (represented by the platen roller 1215 in FIGS. 12 through 14c), as possible. Therefore, each row of encoding elements A, B, C, D may be selected to provide for the shortest starting encoding distance. Also as discussed above, the printer structure and the type and dimensions of the transponder may impact the distances and ranges in which communication with the transponder is possible or reliable. Therefore, the selected row may vary depending on the components of the printer and the type and dimensions of the transponder.

The switching elements 1220 may be controlled by a processor 1250 (e.g., a software, firmware and/or hardware configured processor, which may include a field programmable gate array (FPGA)), a controller, other combinational logic or the like. In this regard, the processor may be configured to retrieve and execute program instructions stored on a computer-readable storage medium for controlling the switching devices 1220.

As another example, according to an embodiment, the processor 1250 may be configured to execute a calibration method for determining the placement (or location) of the transponder on the media unit or determining the optimal encoding element to connect for the transponder. The calibration method may take place automatically (e.g., in response to the system determining that it needs to be calibrated for a particular type of media, due to the lapsing of time, etc.) or in response to receiving a user input associated with the starting of a transponder calibration. In some embodiments, the calibration process will result in the choosing of a RF program position where the leading edge of the media is placed optimally at the print line. In other embodiments, the calibration process will result in determining the midpoint of the longest write streak of the media.

Figure 15A:
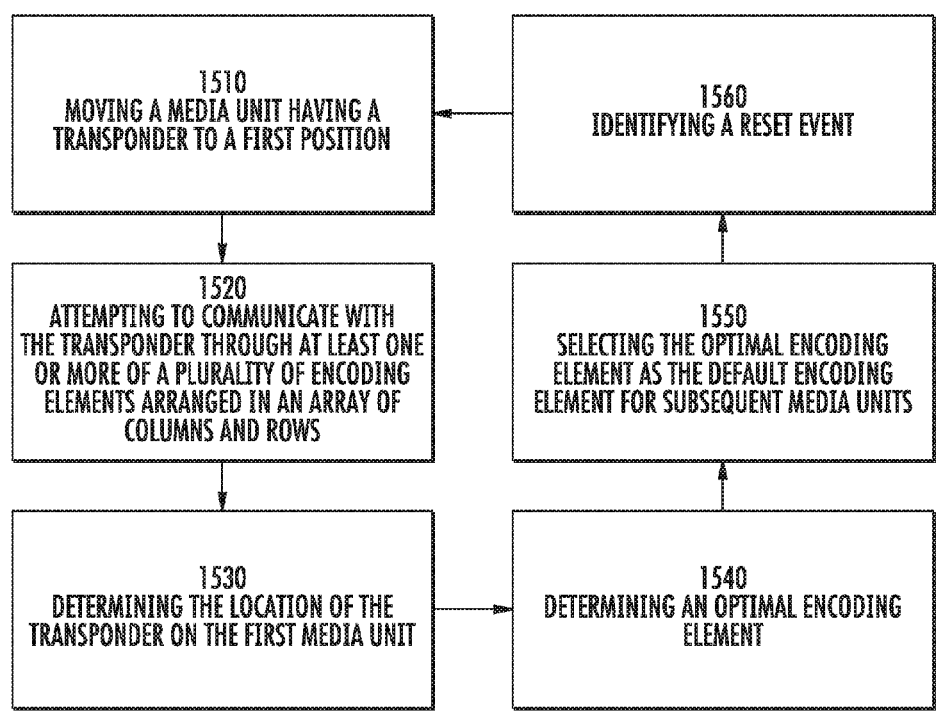
FIG. 15A is a flow chart of a method according to an embodiment.
Figure 15D:
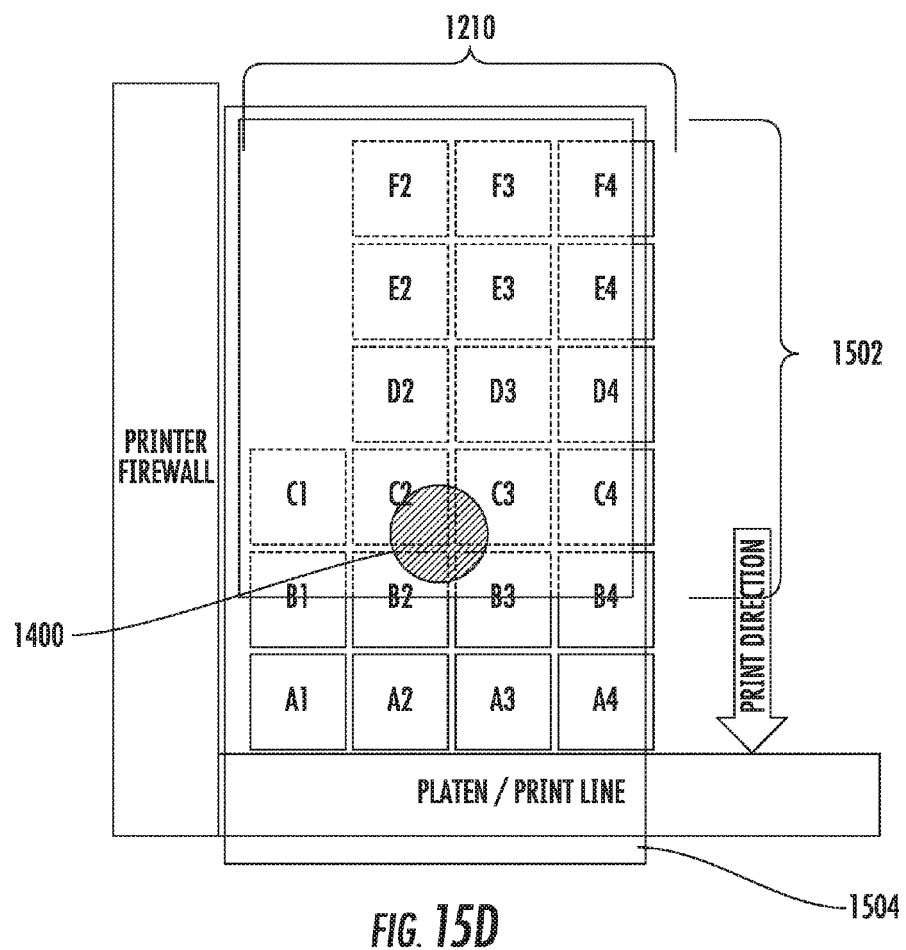

As illustrated in FIGS. 15A-G, the method, at block 1510 of FIG. 15A, may include moving a media 1502 having backing 1504 and an embedded transponder 1400 (as shown in FIG. 15B) to a first position relative to encoding elements 1210 (as shown in FIG. 15C). In some embodiments, the operator may need to confirm there is at least one inch of media backing 1504 outside the system (as shown in FIGS. 15C-15F), which may help allow for the back feeding of the media inlay while helping to prevent the media from falling off the platen in the reverse direction. At least one inch of media backing 1504 outside the system can also help ensure there are no transponders in the "dead zone." (As referred to herein, the dead zone is an area near the print head where a transponder may be unable to be coupled with an encoding element, largely due to the physical distance usually required due to the potential detuning of a transponder in some embodiments.) The method may comprise moving the leading edge of the media away from the print line by, e.g., 20 mm, as shown in FIG. 15D, to further help ensure there is no transponder in the dead zone. Then, at block 1520 of FIG. 15A, the method can include attempting to communicate with the transponder, in a scanning fashion, through at least one or more of the plurality of encoding elements 1210.

Next, at block 1530 of FIG. 15A, the method can comprise determining the location of the transponder on the media unit, by activating one or more encoding elements 1210 in any manner (e.g., from front to back, back to front, diagonally, etc.). The first position may be at or near the print line as shown in FIG. 15C. The communication attempts may include attempting to communicate with the transponder 1400 with each of the encoding elements in the array 1210. The attempts may include at least one attempt per encoding element. For example, attempts may be made for each encoding element through a range of acceptable power levels or at a predetermined power level (such as, e.g., at or near 22 dBm). The determination of the location of the transponder on the media unit (e.g., the location of the transponder relative to a front edge or side edge of the media unit) may be based on the locations (i.e., the row and column) of the encoding elements in which the communication attempts with the transponder were successful and the power levels at which the communication attempts were successful.

Rather than or in addition to determining the relative placement of the transponder 1400 on the media unit 1500, the method may include identifying the optimal encoding element at block 1540 to communicate with the transponder 1400 or, more specifically, for that particular type of transponder on that particular type of media unit. The determination of the optimal encoding element may be based on the encoding element or devices capable of ensuring a reliable encoding process at the lowest power level and the encoding element or devices closest to the printline or other throughput considerations. The optimal criteria may further include selecting a preferred or most-often used location, such as a preferred column or row, in order to identify a single encoding element as the optimal encoding element rather than identify more than one optimal encoding element "candidates." For example, in FIG. 15E, encoding elements B2, B3, C2 and C3 can become the candidates. In some embodiments, such as when the testing occurs from front to back and the transponder is detected near the front, time can potentially be saved by stopping once the candidates have been identified. A "reliable encoding process" may be defined as the ability of the printer-encoder or other system to activate the targeted transponder regardless of its parameter deviations within the same group, and communicate with the targeted transponder through the encoding element while minimizing inadvertent activation of untargeted transponders.

Figure 15E:
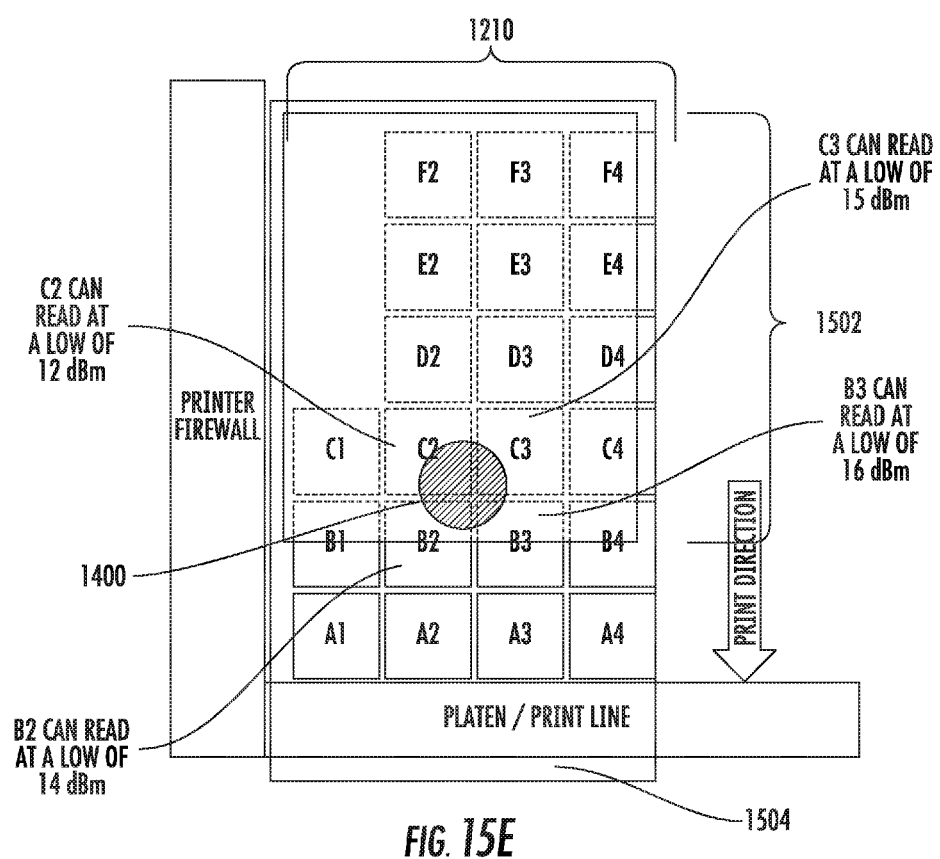
Figure 15F:
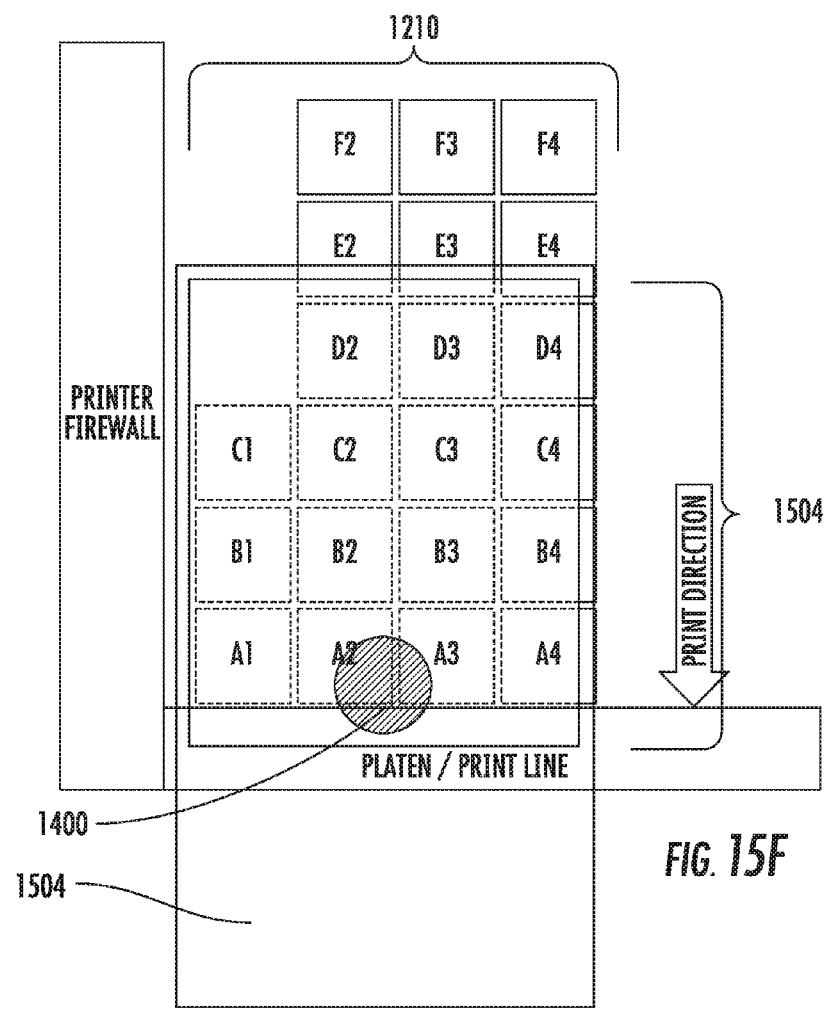

In some embodiments, the candidates represent one or more columns of encoding elements, such as columns 2 and 3 of FIG. 15E, that need to be further evaluated. In such embodiments, the system can continuously test the first row (e.g., the "A" row) to profile the transponder performance. FIG. 15E show various representations of readings taken by the encoding elements in the closest proximity to the transponder. The testing, like the other calibration testing discussed herein, can comprise taking readings every mm of movement, while the media (and the transponder) moves forward until the calibration is complete for each candidate. Next, while an optimal encoding element has yet to be confirmed and the leading edge of the media is within a predetermined distance to the printline (e.g., 3 mm or any other distance that gives the desired tolerance to choose the most robust encoding position) as shown in FIG. 15F, the system can begin testing other encoding elements (which may be in the same column) that can be used to successfully encode the transponder when the media is at the printline. Once enough data is collected as shown in FIG. 15G, a determination is made as to what is the optimal encoding element (as discussed in the preceding paragraph). The criteria for selecting the optimal encoding element can be based on, for example, the encoding element that is positioned to enable encoding at the printline where there is also a buffer of encoding success. The buffer can be a comprised of preconfigured distance (e.g., 2 mm) on either side or can be variable based on the size of the encoding elements, transponder, etc. As another example, the criteria for selecting the optimal encoding element can comprise the encoding element positioned in a manner where there is a buffer but is unrelated to the location of the printline.

Once the optimal encoding element is determined (from the subset of candidates or from all of the array's encoding elements), the identity of the encoding element may be automatically stored at block 1550, e.g., in a memory element 1240 of the encoding module illustrated in FIG. 13 or elsewhere. In subsequent operations, the processor may identify a second or subsequent media unit to be processed and use the stored information to determine the optimal encoding element without requiring another calibration method.

The calibration method may be applied to a first media unit to determine the optimal encoding element for the transponder of the first media unit. In some embodiments, such as an RFID printer-encoder, a plurality of media units can be processed in series one transponder at a time and/or one row of transponders at a time. The plurality of media units are often of the same type and having the same type of transponder. Therefore, the processor may select the optimal encoding element determined for the first media unit as the default encoding element for communicating with subsequent transponders moving along the feed path to be encoded at block 1550.

The optimal encoding element(s) determined for the first media unit may be automatically save to nonvolatile memory and subsequently selected as the encoding element(s) for any subsequent transponders until the processor identifies another event, referred to as a reset event 1560. For example, the processor may use the optimal encoding element determined for the first media unit as the default encoding element until the processor identifies or receives information regarding one or more unsuccessful communication attempts or other communication errors. Once the processor identifies one or more communication errors, the processor may cause the calibration method to repeat.

Rather than or in addition to the calibration method performed by the processor, an operator may manually control the position of the media (by, e.g., effectively moving the media to align the transponders optimally with one or more encoding elements), and then selectively activate the one or more of encoding elements through an operator input element or interface of the printer-encoder, e.g., a keypad. In embodiments that provide both automatic and manual calibration, one or the other may be preconfigured as the default process. A preconfigured naming scheme may allow the operator to easily communicate with the encoding module, and enable the encoding module to identify a particular encoding element or elements to be used to couple with the transponders. For example, the operator may identify the encoding element or devices by row and column (e.g., A2 may select the second element in row A). As another example, the operator may identify the type of media unit. Once the media unit is identified the processor may be configured to identify the optimal encoding element in accordance with data stored in the memory, e.g., a look-up table. The look-up table can be one of many means for the operator to view the settings for one or more the encoding elements 1210. The look-up table, similar to other data stored in memory, can be viewed over the network, on a display integrated into the system, by way of a configuration label or by any other means. In addition to the look-up table, a history of each element used for encoding can be logged in memory. The history log can be presented to the operator in response to the operator indicating a desire to view the history log. By providing the operator direct control of and access to the encoding module, the system can allow for quicker setup of known or desired configurations, such as those used for compliance and engineering testing.

In yet another example, a system, such as a printer-encoder, may include an encoding element and a reader configured to read information from a specifically dedicated identification transponder associated with the supply of media units. The system's supply of media units may include, for example, a roll and an identification transponder attached to the roll. The identification transponder may include information, among other things, about the media unit, including the type of the media unit. The coupler and reader of the printer-encoder may be able to retrieve the information from the identification transponder, thereby allowing the system's processor to identify the type of media unit to be processed and select the most suitable encoding element or elements, e.g., depending on width of media and type and placement of the transponder.

Referring back to the operation of attempting to communicate with the transponder of first media unit through at least one or more of the plurality of encoding elements 1520, the number of encoding elements used and the order in which the encoding elements are tested may vary. For example, according to an embodiment, an attempt to communicate with the transponder may be made through each encoding element of the array. The attempts may occur in order of column and row, e.g., the order may be A1, A2, A3, A4, B1, B2, B3, and so on until each encoding element is tested. As another example, a subset of the encoding elements may be tested according to an algorithm that selects one or more of the elements for testing (thereby selectively omitting one or more of the encoding elements from testing). A "test" refers to an attempt to communicate with a transponder through a particular connected element or elements at a particular power level.

The order or sequence of testing encoding elements may be according to the probability of an encoding element being an optimal encoding element. The system's memory element may store information regarding the most likely encoding elements to be an optimal encoding element, which may be based on the most common media unit used. For example, the manufacturer of the printer-encoder may provide this information based on sales or customer feedback. As another example, a user may provide this information based on the user's preferences or intent. Based on the most common media units, the processor may be able to determine the most likely optimal encoding elements, e.g., through a look-up table stored in the memory element. As yet another example, the processor may monitor and store which encoding elements were considered optimal encoding elements in the past (based on, e.g., past operations of the printer-encoder system), such as the type of supplies used, variable data printed, label design format, descriptive data, XML schema, print date, print time, format date, printing location, operator, IP address, printing application, printing mode (e.g., DT/TT, cut, rewind, peel, etc.), environmental conditions, and/or other operational data.

Once an encoding element is successful in communicating to the transponder, the adjacent encoding elements may be tested. If a second adjacent encoding element is successful, then one or more additional encoding elements (adjacent to the second encoding element) may also be tested. If the second adjacent encoding element is unsuccessful, then the processor may determine to forgo testing additional encoding elements that are adjacent to the second encoding element, but not adjacent to the first encoding element. In other words, the system's algorithm may be configured to specifically choose which encoding elements to test and/or not to test, based on the successful or unsuccessful attempts by other encoding elements.

In the embodiment illustrated in FIG. 12, the array includes four columns and four rows of encoding elements for a total of sixteen encoding elements. In other embodiments, the number of columns, rows, and encoding elements may vary. For example, the number of encoding elements per column or row may vary such that one column or row may have more or less encoding elements than another column or row. The size and shape of the array and the encoding elements may be according to the space available in the system, cost considerations, or the likely media units to be processed by the system.

Figure 19B:
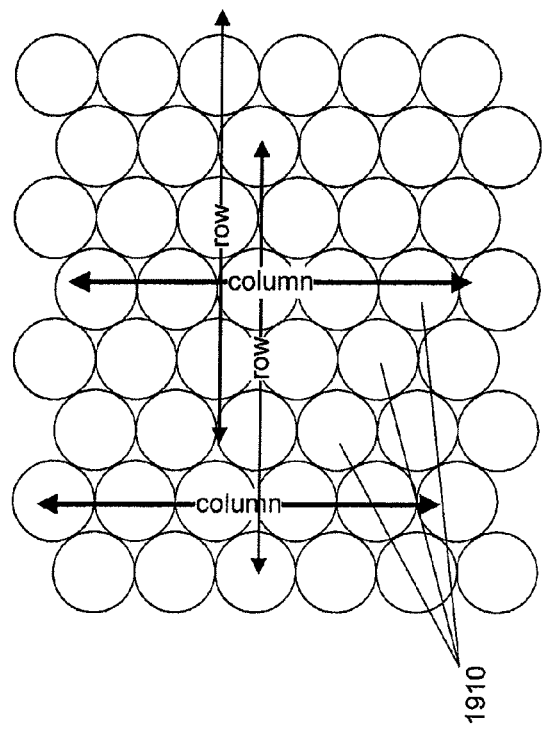
FIG. 19b is a top schematic view of an encoding module according to another embodiment.
Figure 19A:
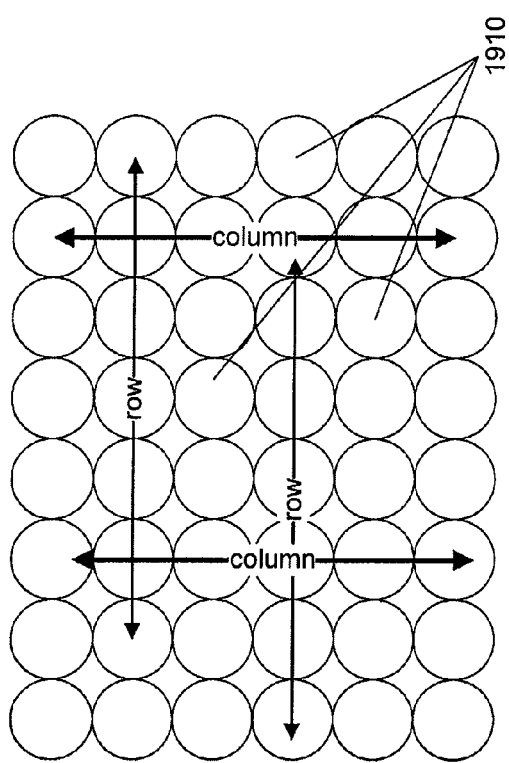
FIG. 19a is a top schematic view of an encoding module according to an embodiment.
Figure 19C:
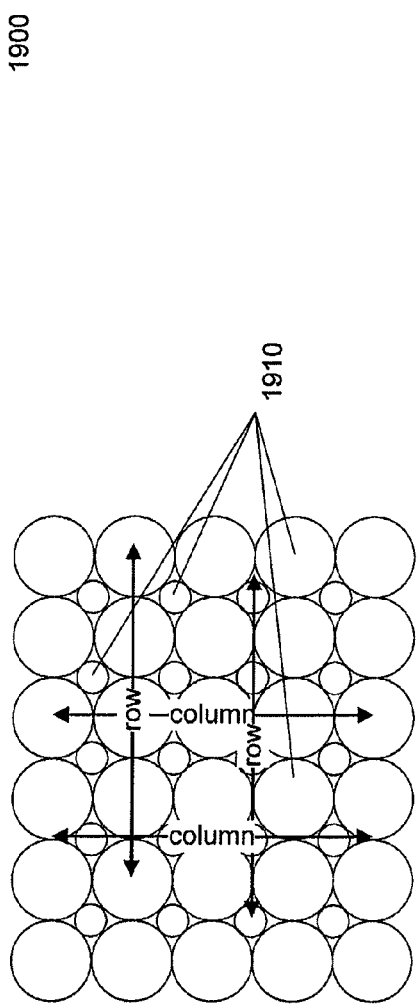
FIG. 19c is a top schematic view of an encoding module according to yet another embodiment.

Moreover, as illustrated in FIGS. 19a through 19b, the rows and columns may be offset from another. As indicated with the arrows, in the embodiment illustrated in FIG. 19a, the rows and columns are aligned with each other, which represents an array 1900 of a plurality of encoding elements 1910 wherein each encoding element is centered with each adjacent encoding element. Again as indicated with the arrows, in the embodiments illustrated in FIGS. 19b and 19c, the columns and rows are offset from each other such that each encoding element is not centered with each adjacent encoding element. For example, in FIG. 19b, the adjacent columns are offset from each other such that the center of an encoding element is centered between the ends of two encoding elements of the adjacent column. In FIG. 19c, every other column has relatively smaller encoding elements creating an offset arrangement.

The above encoding elements and modules are configured to allow for the encoding of more types and sizes of media units and transponders. More particularly, the typical conventional encoding systems include RFID Readers and antennas based on transmission lines, coplanar waveguides, striplines, and other microwave structures. These conventional systems impose strict limitations on the dimensions of the media units and the spacing between adjacent media units. The conventional systems are also not capable of encoding small transponders on their natural pitch. For relatively long media units, a position for every transponder is restricted by its individual specification for different models of both HF and UHF RFID printer-encoders.

The encoding module disclosed herein is capable of encoding both dry and wet inlays on pitch and transponders embedded in relatively long labels with independent orientation and position. As discussed above, the encoding module may include a reader and a 2D array or matrix of magnetic field encoding elements. Each encoding element of the array may be activated sequentially. The reader response allows for determining a transponder position or placement, selecting the optimal encoding element, and analysis of RF operational power level with a sufficient margin. All these measures secure a robust encoding of the detected transponder.

In some embodiments, multiple encoding elements can be used to encode multiple transponders while the media remains stationary. For example, a RFID printer-encoder system may include a number of encoding elements (as shown in, e.g., FIG. 12) that are arranged in a pattern similar to the transponders arranged on the media. The system may receive (e.g., passively accept and/or actively pull) media having the transponders on it into the system. In response to the system determining that the media's transponders are aligned accordingly with respect to the system's encoding elements, encode all of the media's transponders en masse. While the transponders can be quickly encoded en masse, by activating a each encoding element one at a time, to avoid creating noise and interfering with the encoding of adjacent transponders. The mass-encoding process may occur during a single pause in movement of the media through the system. Once the encoding of all the media's transponders is complete, the system may then eject the media from the encoding zone of the system, receive another media, and repeat.

For example, a series of small item button type transponders can be spaced on a media to match the spacing of encoding elements 1210 (i.e., A1, A2, A3, . . . , D3 and D4) of encoding module 1200. All of the button type transponders can then be encoded with only stopping the media's movement once. As such, sixteen button type transponders are encoded without moving the media, which may be useful in, e.g., high volume transponder production for package validation applications. As another example, media having both a dipole type transponder and button type transponders could be programmed simultaneously with the media stopping only once while moving through the encoder-printer system. During a single stop, the dipole transponder could be programmed by one of the encoding elements 1210 (e.g., D4) and a corresponding button type transponder could be programmed by another one of the encoding elements (e.g., A4). The dipole transponder encoded by D4 could then be used for long range identification while the button transponder encoded by A4 could be used for authentication.

Access Control and Encoding Module

In another embodiment, such as the one illustrated in FIGS. 16 through 18, an access card 1600 and encoding module 1700 are provided. The access card 1600 includes a plurality of transponders 1610. For example, the access card 1600 may include a laminated structure having a top layer, a bottom layer, and the plurality of transponders 1610 between the top and bottom layers. The encoding module 1700 includes a plurality of encoding elements 1710, such as loop co-planar waveguides. Each encoding element is configured to have a limited range such that each encoding element can be selectively activated and communicative with one transponder at a time that is in proximity to it. As an example, each of the encoding elements may be any of the encoding elements illustrated in FIGS. 2A-B and 7A-8B. The locations of the transponders on the access card may be configured to correspond to the locations of the encoding elements on the encoding module.

The encoding module may form part of an access control system 1800. In order to gain access to a particular area, the user or wearer of the access card 1600 has to place the access card 1600 near the encoding module 1700. For example, the encoding module 1700 may include a slot 1720 configured to receive the access card 1600. Once the access card is inserted into the slot, a reader 1810 can attempt to communicate with each of the transponders 1610 of the access card through the encoding elements 1710 of the encoding module. If the access card is proper, the transponders are positioned such that the communication is possible because the transponders and the encoding elements are aligned. If the access card is not proper, e.g., a forgery, it is less likely the number and location of the transponders are consistent with the encoding module. Therefore, the access control system 1800 is more likely to detect the improperness of the access card and deny access. The access card may incorporate additional authentication features as further disclosed in commonly owned U.S. Pat. No. 7,137,000 which is hereby incorporated herein by reference in its entirety. For example, for every transponder, the algorithm of generating a password might be different which further complicate efforts to develop counterfeits.

As with conventional cards, the transponders may also contain information that confirms the proper access for the user or wearer. The encoding module and access card of the embodiment illustrated in FIGS. 16 through 18 provide an additional layer of security by requiring a plurality of transponders in a particular arrangement to allow access. The number and pattern of transponders and encoding elements may vary. For example, the transponders and the encoding elements may be in an uncommon and uneven shape.

Modular Encoding Elements or Coupling Devices

As discussed above, the preferred location and type of each encoding element may depend on the placement and type of each transponder. Embodiments disclosed herein address this challenge by providing an array of encoding elements in which the connected encoding elements may be varied accordingly.

In addition to or rather than providing the array, embodiments may provide a common connector for various types and size encoding elements or coupling devices. For example, as illustrated in the embodiments of FIGS. 20*a* through 21, the system 2100, such as a printer-encoder, may include or define an adapter 2110. The adapter 2110 is specifically configured to receive and engage a particular shape and size connector 2020 of a coupling device such that, once the connector 2020 engages the adapter 2100, an electrical connection is formed between the coupling device and the system 2100 or more specifically the reader of the system. Although the coupling devices 2000, 2001, 2002 of FIGS. 20*a* through 20*c* differ in size, shape, and type, each can include the same type of connector 2020 configured for the adapter 2110 of the system. Therefore, due to the use of a common type of connector 2020, the system may use various sizes, shapes, and types of coupling devices depending on the placement and type of transponders to be processed.

For example, different encoding modules as disclosed may be interchangeable. A first encoding module may have an array such as the one illustrated in FIG. 19*a* and the second encoding module may have an array such as the one illustrated in FIG. 19*c*. Because the first and second encoding modules have the same type of connector, a user may easily replace the first encoding module with the second encoding module in a printer-encoder system, thereby allowing the system to accommodate different types of transponders. As another example, a first type of coupling device and a second type of coupling device can be utilized. The first type of coupling device may be a co-planar waveguide and the second type of coupling device may be a loaded stripline. Because the two types of coupling devices have the same type of connector, a user may manually replace or the system may automatically replace the first coupling device with the second coupling device to accommodate different types of the transponders.

Smart Sweep

In addition to or as an alternative to the calibration process discussed above (see, e.g., FIGS. 15A-15G), embodiments of the present invention can be configured to execute a smart sweep algorithm. While the transponder calibration algorithm can be used to determine the ideal encoding element, power setting, and encoding transponder position, the smart sweep algorithm of FIG. 22 can provide the ability for a printer-encoder or other system to function in an environment having a characteristic sometimes referred to as a "transponder placement independence," which includes situations when transponders are positioned vertically (along the feed line) on the media within a certain range (such as, e.g., within 15 mm to 60 mm) of each other. The smart sweep algorithm can be reserved for and/or most effective in embodiments utilizing media of a minimum length relative to the range (such as, e.g., 2 inches). For example, the smart sweep algorithm can be used with four-inch dipole transponders, three-inch dipole transponders, and/or high gain tag types.

Figure 22:
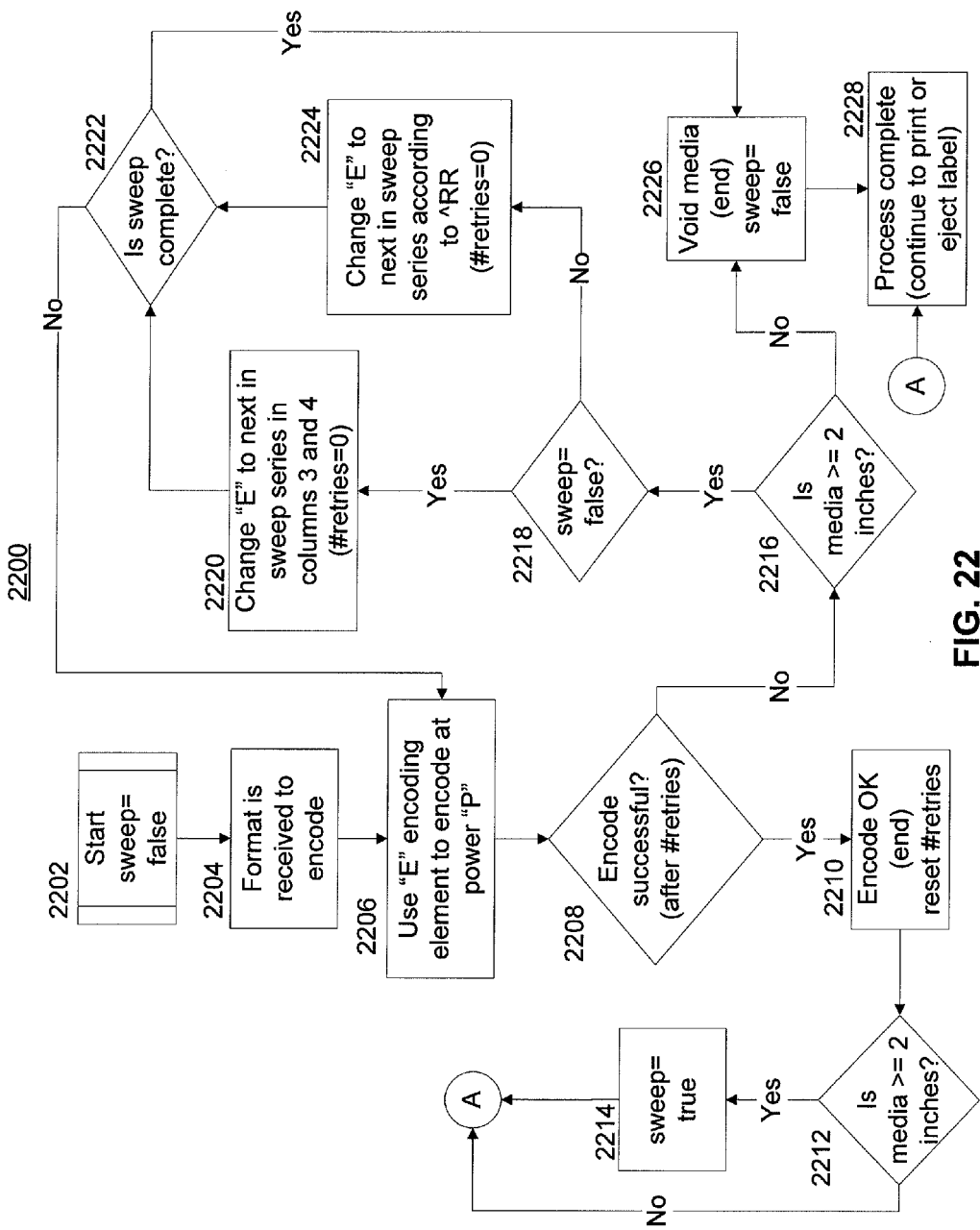
FIG. 22 is a flow chart of a method according to embodiments configured to implement the smart sweep functionality.

Process 2200 of FIG. 22 shows one exemplary method that firmware, software, any other type of system (or component thereof), or any combination thereof can be configured to execute. Process 2200 effectively "sweeps" the encoding elements to find and encode a transponder. At block 2202, the process 2200 starts with the sweep value set to false. The sweep value can be set to FALSE when, for example, the printer head is closed or the system is initially powered ON.

Next, at block 2204, a format is received by the system for encoding a media that is positioned or may be positioned with the media's leading edge at the printer-encoder's printline. The format can be provided by, for example, a host computer, the printer-encoder's central processor, a memory component, any other electrical component, or any combination thereof. As shown in FIG. 22, the format can be received whenever the printer-encoder is powered ON. In some instances, a triggering event can cause the format to be received. Examples of trigger events include when the printer-encoder is initially powered ON and/or the printer head is opened. The format can be in the form of, for example, a ZPL command, any other type of command signal, or combination thereof.

The media can have an embedded or other type of transponder. At block 2206, one of the encoding elements ("E") is activated and attempts to encode the transponder using a particular amount of power ("P"). E can be set at block 2206, for example, using the sweep series algorithm discussed herein, manually, and/or by using the transponder calibration method; examples of both methods are discussed above in connection with, e.g., FIGS. 15A-15G. P can be set, for example, automatically by the system (using, e.g., the transponder calibration method) and/or manually in response to an input received from the operator.

Next, at block 2208, a determination is made as to whether the encoding of the transponder using E was successful. This determination can be made after a predetermined number of retries. The number of retries can be preconfigured into the system and/or be a manually set variable. If the encoding was successfully performed within the number of allotted tries, the encoding process ends at block 2210. Accordingly, at block 2210, the power supplied to E can be turned OFF or otherwise reduced.

Next in process 2200 is block 2212, in which a determination is made as to whether the media was greater than or equal to two inches (or any other minimum size that can be preconfigured for each printer-encoder and/or each type of printer encoder, be set manually, and/or be automatically determined based on any other variable(s)). If the media is determined to be greater than two inches, process 2200 proceeds back to block 2202. In response to determining that the media is at least two inches, process 2200 proceeds to block 2214 and the sweep value is set as TRUE, indicating that the sweep function was successfully performed. Process 2200 then proceeds to block 2228 where the media is ejected, printed on, or otherwise processed, and then process 2200 ends. One skilled in the art would appreciate that the amount of 2 inches is meant to be exemplary only of a minimum size. Different printing requirements, encoding element configurations, types of media, etc. can allow (and may even require) process 2200 to utilize one or more other length confirmation determinations. Also, some embodiments of the present invention may provide for the omission of one or more of the steps discussed herein.

Returning to block 2208, in response to a determination being made that the encoding was unsuccessful too many times, process 2200 proceeds to block 2216. At block 2216, process 2200 determines whether or not the media is greater than or equal to 2 inches in length. If the media is determined to be greater than two inches, process 2200 proceeds to block 2218.

At block 2218, process 2200 determines whether or not sweep is currently set to the value FALSE. In response to determining sweep is set to FALSE, process 2200 moves to block 2220 and changes E to the next encoding element in the sweep series. Also, the number of retries value is reset to 0. This will enable the new E encoding element to have the same number of retries as the pervious encoding element. In some embodiments, the system can be configured to set the new E to an encoder in columns 4 and 3 before moving onto columns 1 and 2. This may allow for the array of encoding elements to do a front-to-back sweep of the media. In other embodiments, the sweep can be performed in any direction, including back-to-front, random selection, right-to-left, left-to-right, diagonally, a combination thereof, and/or by any other algorithm.

In response to determining at block 2218 that sweep is not set at FALSE, process 2200 proceeds to block 2224 and E is changed to be set as the next encoding element, which can be chosen based on the same or a different algorithm than those discussed in connection with block 2220. For example, the next encoding element in the sweep series could be chosen based on a retry command, which can comprise an additional way to sweep after all the first set of retries have been unsuccessfully exhausted. The operator, for example, could be given some level of control at block 2224 in defining what to do if the encoding element array fails to find and encode the transponder. This may include, for example, receiving operator input of a particular encoding element (such as, e.g., B4 or D4) if C4 was not encoding the transponder successfully. In some embodiments, the operator may also choose to void and abort process 2200, but giving the operator the opportunity to manually select another encoding element may help reduce the void rate. As another example, the customer can select one or more algorithms (instead of one or more particular encoding elements) to be used in selecting the next E in the sweep series. The number of retries value is also set to zero at block 2224. In some embodiments the number of retries value can be a user configurable value and/or any other number other than zero that can be updated subsequent to the printer-encoder's manufacturer's configuration.

After blocks 2224 and 2220, process 2200 proceeds to block 2222 and determines whether the sweep is complete. In response to determining the sweep is complete at block 2222 or subsequent to determining at block 2216 that the media is less than 2 inches, process 2200 proceeds to block 2226 at which the media is voided and the sweep value is set to FALSE. Process 2200 then proceeds to block 2228 (discussed above) and ends.

Many combinations and modifications to the embodiments discussed herein as well as other embodiments of the invention set forth herein will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An encoding element, comprising:
   a first conductive layer;
   a first dielectric substrate disposed adjacent to the first conductive layer;
   a second dielectric substrate;
   a shield disposed adjacent to the second dielectric substrate; and
   a conductive strip disposed between the first dielectric substrate and the second dielectric substrate, wherein:
   the conductive strip includes a loop shape;
   the first dielectric substrate electrically separates the conductive strip from the first conductive layer;
   the conductive strip and the first conductive layer define a transmission line configured to generate magnetic fields concentrated in a near field region of the transmission line when an electrical signal is passed through the conductive strip;
   the second dielectric substrate electrically separates the conductive strip from the shield;
   the shield includes a split-ring shape corresponding to the loop shape of the conductive strip; and
   the split-ring shape of the shield and the loop shape of the conductive strip are concentric with each other.

2. The encoding element of claim 1, wherein the loop shape of the conductive strip is aligned with a centerline of the split-ring shape of the shield.

3. The encoding element of claim 1 further comprising one or more vias electrically connecting the shield to the first conductive layer.

4. The encoding element of claim 1 further comprising a first plurality of vias disposed along an inner edge of the shield and a second plurality of vias disposed along an outer edge of the shield, wherein the first plurality of vias and the second plurality of vias electrically connect the shield to the first conductive layer.

5. The encoding element of claim 1, wherein:
   the split-ring shape defines a central open area of the shield; and
   the first conductive layer further defines a hole that is concentric with the central open area.

6. The encoding element of claim 1 further comprising:
an input and output port; and
a terminating load, wherein the conductive strip includes a first end connected to the input and output port and a second end connected to the terminating load.

7. The encoding element of claim 6, wherein the terminating load is further connected with the first conductive layer.

8. The encoding element of claim 1, wherein one or more of first dielectric substrate or the second dielectric substrate comprises a dielectric material selected from at least one of plastic, glass, ceramic, Rogers materials, Isosola materials, woven glass reinforced expoxy laminate, or air.

9. An radio frequency identification (RFID) system, comprising:
a reader; and
one or more encoding elements, the one or more encoding elements including a first encoding element comprising:
a first conductive layer; and
a conductive strip including a loop shape; wherein:
the conductive strip is electrically isolated from the first conductive layer;
the conductive strip and the first conductive layer define a transmission line configured to generate magnetic fields concentrated in a near field region of the transmission line when an electrical signal is passed from the reader through the conductive strip;
the first encoding element further includes a shield; and
the conductive strip is disposed between and electrically isolated from the first conductive layer and the shield;
the shield includes a split-ring shape corresponding to the loop shape of the conductive strip, the split-ring shape defining a central open area of the shield;
and the first conductive layer further defines a hole that is concentric with the central open area.

10. The RFID system of claim 9, wherein the first encoding elements further includes one or more vias electrically connecting the shield to the first conductive layer.

11. The RFID system of claim 9, wherein the first encoding element further includes:
a first dielectric substrate disposed between the first conductive layer and the conductive strip; and
a second dielectric substrate disposed between the shield and the conductive strip.

12. The RFID system of claim 9 further including a conveyance system configured to carry media units through the near field region.

13. The RFID system of claim 9, wherein first encoding element further includes:
an input and output port connected with the reader; and
a terminating load connected to the first conductive layer, wherein the conductive strip includes a first end connected to the input and output port and a second end connected to the terminating load.

14. The RFID system of claim 13, wherein the terminating load includes an impedance that is equal to a system impedance of the RFID system.

15. The RFID system of claim 13, wherein the transmission line includes an impedance that is equal to the impedance of the terminating load and the system impedance.

16. An encoding element, comprising:
a first conductive layer;
a first dielectric substrate disposed adjacent to the first conductive layer;
a second dielectric substrate;
a shield disposed adjacent to the second dielectric substrate; and
a conductive strip disposed between the first dielectric substrate and the second dielectric substrate, wherein:
the conductive strip includes a loop shape;
the first dielectric substrate electrically separates the conductive strip from the first conductive layer;
the conductive strip and the first conductive layer define a transmission line configured to generate magnetic fields concentrated in a near field region of the transmission line when an electrical signal is passed through the conductive strip;
the second dielectric substrate electrically separates the conductive strip from the shield;
the shield includes a split-ring shape corresponding to the loop shape of the conductive strip; and
the loop shape of the conductive strip is aligned with a centerline of the split-ring shape of the shield.

17. The encoding element of claim 16 further comprising one or more vias electrically connecting the shield to the first conductive layer.

18. The encoding element of claim 16 further comprising a first plurality of vias disposed along an inner edge of the shield and a second plurality of vias disposed along an outer edge of the shield, wherein the first plurality of vias and the second plurality of vias electrically connect the shield to the first conductive layer.

19. The encoding element of claim 16, wherein:
the split-ring shape defines a central open area of the shield;
the split-ring shape of the shield and the loop shape of the conductive strip are concentric; and
the first conductive layer further defines a hole that is concentric with the central open area.

20. The encoding element of claim 16 further comprising:
an input and output port; and
a terminating load, wherein the conductive strip includes a first end connected to the input and output port and a second end connected to the terminating load.

21. The encoding element of claim 20, wherein the terminating load is further connected with the first conductive layer.

22. The encoding element of claim 16, wherein one or more of first dielectric substrate or the second dielectric substrate comprises a dielectric material selected from at least one of plastic, glass, ceramic, Rogers materials, Isosola materials, woven glass reinforced expoxy laminate, or air.

* * * * *